(12) United States Patent
Inoue et al.

(10) Patent No.: US 7,400,278 B2
(45) Date of Patent: Jul. 15, 2008

(54) ECHO PREVENTION CIRCUIT, FILTER COEFFICIENT SETTING METHOD, AND RECORDING MEDIUM WITH PROGRAM RECORDED

(75) Inventors: Takeo Inoue, Hirakata (JP); Hideki Ohashi, Kyoto (JP); Yoshitaka Onaya, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/681,643

(22) Filed: Mar. 2, 2007

(65) Prior Publication Data
US 2007/0205932 A1   Sep. 6, 2007

(30) Foreign Application Priority Data
Mar. 2, 2006   (JP)   ............................. 2006-056499

(51) Int. Cl.
*H03M 1/00*   (2006.01)
(52) U.S. Cl. ........................................ 341/110; 370/289
(58) Field of Classification Search ................ 341/110, 341/144, 155, 118, 120; 370/289, 291; 379/406.5
See application file for complete search history.

(56) References Cited
U.S. PATENT DOCUMENTS
4,602,133 A * 7/1986 O'Neill ....................... 370/286

| | | | |
|---|---|---|---|
| 6,480,532 B1 * | 11/2002 | Vareljian | 375/222 |
| 6,658,055 B1 * | 12/2003 | Darr | 375/232 |
| 6,674,810 B1 * | 1/2004 | Cheng | 375/296 |
| 6,771,771 B1 * | 8/2004 | Moon et al. | 379/406.01 |
| 7,173,962 B2 * | 2/2007 | Dowling | 375/222 |

FOREIGN PATENT DOCUMENTS
JP   2001-060895   3/2001

* cited by examiner

*Primary Examiner*—Peguy JeanPierre
(74) *Attorney, Agent, or Firm*—SoCal IP Law Group LLP; Steven C. Sereboff; John E. Gunther

(57) ABSTRACT

An echo prevention circuit includes a filter that receives a first digital signal and outputs second and third digital signals; first and second DA converter that convert the second and third digital signals into first and second analog signals respectively; a circuit to subtract the second analog signal from a signal generated by combining the first analog signal and a third analog signal, a circuit to amplify the signal from the subtracting circuit; an AD converter that converts the amplified signal into a digital signal; a responsive signal acquiring unit to acquire a first response signal from the input of the first DA converter to the output of the AD converter and to acquire a second response signal from the input of the second DA converter to the output of the AD converter; and a unit to set filter coefficients based on the first and second response signals.

17 Claims, 12 Drawing Sheets

SMALL IMPULSE (VULNERABLE TO NOISES)

TIME

APPROPRIATELY SIZED IMPULSE RESPONSES

TIME

APPROPRIATELY SIZED IMPULSE (RESISTANT TO NOISES)

OVERFLOWING IMPULSE RESPONSES

ECHO PREVENTION CIRCUIT, FILTER COEFFICIENT SETTING METHOD, AND RECORDING MEDIUM WITH PROGRAM RECORDED

CROSS-REFERENCE TO RELATED APPLICATION

This application claims the benefit of priority to Japanese Patent Application No. 2006-56499, filed Mar. 2, 2006, of which full contents are incorporated herein by reference.

BACKGROUND OF THE INVENTION

1. Field of the Invention

The present invention relates to an echo prevention circuit, a filter coefficient setting method, and a recording medium with program recorded.

2. Description of the Related Art

Recently, for example, in some communication devices such as mobile phones and hands-free phones connected to earphone microphones, echo prevention circuits are incorporated to prevent echo from occurring due to acoustic coupling from speaker to microphone, electric reflection on circuits, etc. For example, Japanese Patent Publication No. 3293029 discloses a circuit preventing echo by canceling an input signal with the use of a signal having the antiphase of and the same amplitude level as the input signal. However, although in the configuration disclosed in Japanese Patent Publication No. 3293029, a circuit constant of each circuit element must be set highly accurately to cancel the echo highly accurately, such setting is not easy and the echo cannot be cancelled highly accurately.

Therefore, a method is considered for canceling echo highly accurately with the use of digital processing. FIG. 15 depicts an example of an echo prevention circuit using a DSP 200. As shown in FIG. 15, an AD converter 201 receives input of an analogue signal representing voices transmitted from the other party using a mobile phone, etc. The signal is converted to digital by the AD converter 201 and output after a convolution process is performed by FIR filters 202, 203 in the DSP 200 based on each filter coefficients. The signal output from the FIR filter 202 is input to a DA converter 204. The signal is converted to analog by the DA converter 204, is amplified by an amplification circuit 205 and output to an earphone microphone through an input/output terminal 206, and is input to one terminal of a differential amplification circuit 207. The signal output from the FIR filter 203 is input to a DA converter 208. The signal output from the DA converter 208 is amplified by an amplification circuit 209 and input to the other terminal of the differential amplification circuit 207.

The signal output from the differential amplification circuit 207 is amplified by an amplification circuit 210, converted into a digital signal by an AD converter 211, and input to the DSP 200. This digital signal is output from the DSP 200, converted to an analog signal by a DA converter 212, and output as the output signal of the echo prevention circuit.

The DSP 200 acquires an impulse response of the DA converter 204 through the AD converter 211 from the output of the AD converter 211 when outputting an impulse to the DA converter 204. The DSP 200 also acquires an impulse response of the DA converter 208 through the AD converter 211 from the output of the AD converter 211 when outputting an impulse to the DA converter 208. The echo can be cancelled by appropriately setting the filter coefficients of the FIR filters 202, 203 based on these impulse responses.

By the way, although an earphone microphone can convert voices generated in the ear due to vocalization into an analog signal to be output, this signal is very weak. Therefore, in the echo prevention circuit shown in FIG. 15, the weak signal input from the earphone microphone is amplified by the differential amplification circuit 207 and the amplification circuit 210 by about 50 dB, for example.

In such an echo prevention circuit, the differential amplification circuit 207 and the amplification circuit 210 also amplify the impulse generated when acquiring the impulse responses used for setting the filter coefficients of the FIR filters 202, 203. Therefore, by generating a small impulse as shown in FIG. 16A, suitably sized impulse responses can be acquired as shown in FIG. 16B. However, since a small impulse as shown in FIG. 16A is vulnerable to circuit noises, background noises input from the earphone microphone, etc., accurate impulse responses cannot be acquired. On the other hand, if the impulse is increased to reduce vulnerability to circuit noises and background noises as shown in FIG. 17A, the impulse responses will overflow in the AD converter 211 as shown in FIG. 17B.

Therefore, in the echo prevention circuit shown in FIG. 15, since the accuracy of the acquirable impulse responses is low and the filter coefficients cannot be set appropriately for the FIR filters 202, 203, it is difficult to cancel the echo effectively.

SUMMARY OF THE INVENTION

The object of the present invention is to provide an echo prevention circuit, a filter coefficient setting method, and program, which can effectively prevent echo by acquiring highly-accurate impulse responses.

In order to achieve the above object, according to a first aspect of the present invention there is provided an echo prevention circuit comprising a filter that is inputted with a first digital signal, the filter outputting second and third digital signals; a first DA converter that converts the second digital signal into a first analog signal and outputs the first analog signal; a second DA converter that converts the third digital signal into a second analog signal and outputs the second analog signal; an input/output terminal that outputs the first analog signal or that is inputted with a third analog signal; a subtracting circuit that outputs a fourth analog signal acquired by subtracting the second analog signal from a signal generated by combining the first analog signal and the third analog signal; an amplification circuit that amplifies the signal output from the subtracting circuit and outputs the amplified signal; an AD converter that converts the signal output from the amplification circuit into a digital signal and outputs the digital signal; a response signal acquiring unit that inputs a first signal to the first DA converter to acquire a first response signal from the input of the first DA converter to the output of the AD converter, the response signal acquiring unit inputting a second signal to the second DA converter to acquire a second response signal from the input of the second DA converter to the output of the AD converter; and a filter coefficient setting unit that sets filter coefficients to the filter based on the first and second response signals such that the fourth analog signal becomes a signal generated by removing or attenuating the first analog signal from the signal generated by combining the first analog signal and the third analog signal, the amplification circuit setting a gain to a first gain in response to a first control signal input before acquiring the first and second response signals, the amplification circuit setting the gain to a second gain larger than the first gain in response to a second control signal input after acquiring the first and second response signals.

In order to achieve the above object, according to a second aspect of the present invention there is provided a filter coefficient setting method of an echo prevention circuit including a filter that is inputted with a first digital signal, the filter outputting second and third digital signals; a first DA converter that converts the second digital signal into a first analog signal and outputs the first analog signal; a second DA converter that converts the third digital signal into a second analog signal and outputs the second analog signal; an input/output terminal that outputs the first analog signal or that is inputted with a third analog signal; a subtracting circuit that outputs a fourth analog signal acquired by subtracting the second analog signal from a signal generated by combining the first analog signal and the third analog signal; an amplification circuit that amplifies the signal output from the subtracting circuit and outputs the amplified signal; and an AD converter that converts the signal output from the amplification circuit into a digital signal and outputs the digital signal, the method comprising the steps of setting the gain of the amplification circuit to a first gain in response to a first control signal input; inputting a first signal to the first DA converter to acquire a first response signal from the input of the first DA converter to the output of the AD converter and inputting a second signal to the second DA converter to acquire a second response signal from the input of the second DA converter to the output of the AD converter; setting filter coefficients to the filter based on the first and second response signals such that the fourth analog signal becomes a signal generated by removing or attenuating the first analog signal from the signal generated by combining the first analog signal and the third analog signal; and setting the gain to a second gain larger than the first gain in response to a second control signal input after acquiring the first and second response signals.

In order to achieve the above object, according to a third aspect of the present invention there is provided a recording medium having recorded thereon a program operable to drive a processor of an echo prevention circuit including the processor; a filter that is inputted with a first digital signal, the filter outputting second and third digital signals; a first DA converter that converts the second digital signal into a first analog signal and outputs the first analog signal; a second DA converter that converts the third digital signal into a second analog signal and outputs the second analog signal; an input/output terminal that outputs the first analog signal or that is inputted with a third analog signal; a subtracting circuit that outputs a fourth analog signal acquired by subtracting the second analog signal from a signal generated by combining the first analog signal and the third analog signal; an amplification circuit that amplifies the signal output from the subtracting circuit with a first gain or a second gain larger than the first gain and outputs the amplified signal; an AD converter that converts the signal output from the amplification circuit into a digital signal and outputs the digital signal; a response signal acquiring unit that inputs a first signal to the first DA converter to acquire a first response signal from the input of the first DA converter to the output of the AD converter, the response signal acquiring unit inputting a second signal to the second DA converter to acquire a second response signal from the input of the second DA converter to the output of the AD converter; and a filter coefficient setting unit that sets filter coefficients to the filter based on the first and second response signals such that the fourth analog signal becomes a signal generated by removing or attenuating the first analog signal from the signal generated by combining the first analog signal and the third analog signal, to implement functions of outputting to the amplification circuit a first control signal for setting the gain of the amplification circuit to the first gain; allowing the response signal acquiring unit to acquire the first and second response signals after the gain of the amplification circuit is set to the first gain and allowing the filter coefficient setting unit to set the filter coefficients of the filter based on the first and second response signals; and outputting to the amplification circuit a second control signal for setting the gain of the amplification circuit to the second gain after acquiring the first and second response signals.

Other features of the present invention will become apparent from the description herein and the accompanying drawings.

BRIEF DESCRIPTION OF THE DRAWINGS

To understand the present invention and the advantages thereof more thoroughly, the following description should be read in conjunction with the accompanying drawings.

FIG. 11 is a diagrammatic view of a mobile phone having the echo prevention circuit built-in;

FIG. 12 depicts a configuration example of a mobile phone having the echo prevention circuit built-in;

DETAILED DESCRIPTION OF THE INVENTION

From the contents of the description and the accompanying drawings, at least the following details will become apparent.

==Overall Configuration==

Figure 1:
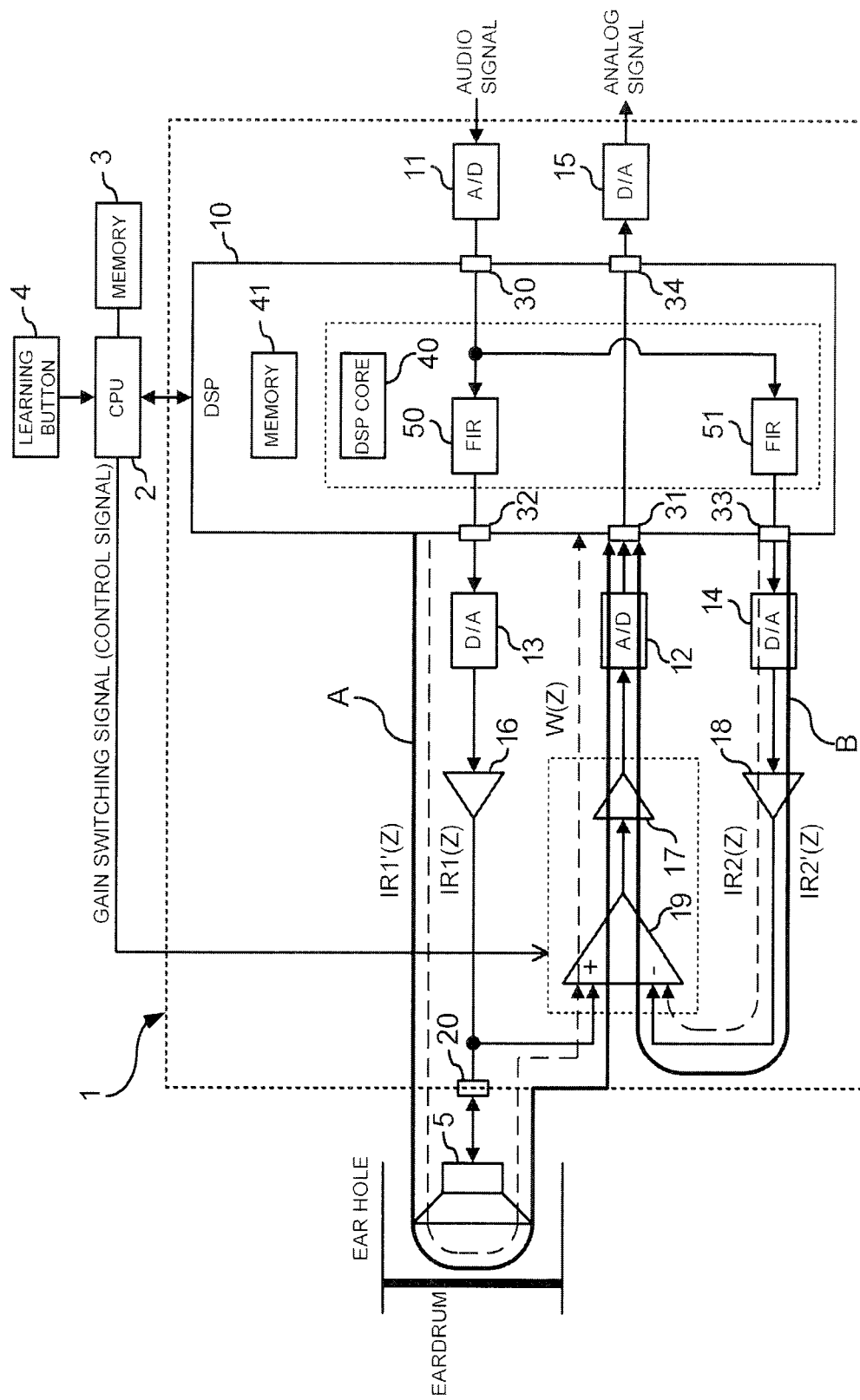
FIG. 1 is a block diagram of an example of a system including an echo prevention circuit to which the present invention is applied.

FIG. 1 is a block diagram of an example of a system including an echo prevention circuit to which the present invention is applied. The system includes an echo prevention circuit 1, a CPU (Central Processing Unit) 2, a memory 3, a learning button 4, and an earphone microphone 5.

The echo prevention circuit 1 is a circuit that prevents echo generated by sending back to the other party an audio signal transmitted from the other party, etc.

The CPU 2 controls the entire system and outputs various control signals to the echo prevention circuit 1. For example, when receiving input of a reset signal for resetting the echo prevention circuit 1, the CPU 2 outputs to the echo prevention circuit 1 an instruction signal for executing a filter coefficient setting process described later. For example, when detecting power-on for activating the echo prevention circuit 1, the CPU 2 may output the above instruction signal to the echo prevention circuit 1. For example, when detecting an electrical change in an analog circuit, the CPU 2 may output the above instruction signal to the echo prevention circuit 1.

The memory 3 is a storage circuit such as a RAM (Random Access Memory) or flash memory and stores executable programs for the CPU 2, data generated by the CPU 2, etc.

The learning button 4 is used for transmitting to the CPU 2 an instruction for making the echo prevention circuit 1 perform impulse learning described later.

The earphone microphone 5 includes a speaker function that generates voices by vibrating a vibration plate (not shown) based on input audio signals. The earphone microphone 5 also includes a microphone function that generates audio signals by converting vibration of the eardrum into vibration of the vibration plate when a person wearing the earphone microphone 5 emits a sound. The earphone microphone 5 is a well-known technology and is described in Japanese Patent Application Laid-Open Publication No. 2003-9272, etc.

The echo prevention circuit 1 includes a digital signal processor (DSP) 10, AD converters 11, 12, DA converters 13 to 15, amplification circuits 16 to 18, differential amplification circuit 19, and an input/output terminal 20. The DA converter 13 corresponds to a first DA converter of the present invention, and the DA converter 14 corresponds to a second DA converter of the present invention. The differential amplification circuit 19 corresponds to a subtracting circuit of the present invention, and one or both of the differential amplification circuit 19 and the amplification circuit 17 correspond to an amplification circuit of the present invention.

The DSP 10 includes input terminals 30, 31, output terminals 32 to 34, a DSP core 40, and a memory 41. The DSP 10 includes FIR filter 50, 51. The FIR filters 50, 51 are realized by executing a program stored in the memory 41 with the DSP core 40. A filter configured by the FIR filter 50 (first FIR filter) and the FIR filter 51 (second FIR filter) corresponds to a filter of the present invention. The FIR filters 50, 51 can be realized as hardware.

For example, an audio signal is input to the AD converter 11. The AD converter 11 inputs through the input terminal 30 to the DSP 10 a digital signal (first digital signal) acquired by performing the analog-digital conversion process for the audio signal.

The digital signal input to the DSP 10 is input to each of the FIR filter 50, 51. The FIR filter 50 outputs to the output terminal 32 a digital signal (second digital signal) acquired by performing a convolution calculation process for the input digital signal based on the filter coefficients of the FIR filter 50. Concurrently, the FIR filter 51 outputs to the output terminal 33 a digital signal (third digital signal) acquired by performing a convolution calculation process for the input digital signal based on the filter coefficients of the FIR filter 51.

The output signal from the FIR filter 50 is input to the DA converter 13. The DA converter 13 outputs to the amplification circuit 16 an analog signal (first analog signal) acquired by performing a digital-analog conversion process for the output signal from the FIR filter 50. The amplification circuit 16 amplifies the analog signal with a predetermined amplification rate and outputs the signal.

The input/output terminal 20 is connected to the earphone microphone 5. Therefore, the earphone microphone 5 generates voices by vibrating the vibration plate (not shown) based on the audio signal input from the input/output terminal 20. The earphone microphone 5 also generates an audio signal (third analog signal) by converting vibration of the eardrum into vibration of the vibration plate when a person wearing the earphone microphone 5 emits a sound. The audio signal (third analog signal) generated by the earphone microphone 5 is input to a + input terminal of the differential amplification circuit 19 through the input/output terminal 20. The signal output through the input/output terminal 20 to the earphone microphone 5 is reflected and input from the input/output terminal 20 to the + input terminal of the differential amplification circuit 19. The reflected signal is, for example, a signal returned through the earphone microphone 5, and a signal acquired when the sound output from the earphone microphone 5 is reflected in the ear and the reflected sound is converted into an audio signal by the earphone microphone 5. The input or output of the output signal or input signal is not exclusively performed at the input/output terminal 20. For example, the input and output of the output signal and input signal may be concurrently performed at the input/output terminal 20.

The output signal from the FIR filter 51 is input through the output terminal 33 to the DA converter 14. The DA converter 14 outputs to the amplification circuit 18 an analog signal (second analog signal) acquired by performing the digital-analog conversion process for the output signal from the FIR filter 51. The amplification circuit 18 amplifies the analog signal with a predetermined amplification rate and outputs the signal to a − input terminal of the differential amplification circuit 19.

The differential amplification circuit 19 outputs a signal (fourth analog signal) acquired by amplifying a difference between the analog signal input to the + input terminal and the analog signal input to the − input terminal. The amplification circuit 17 amplifies the signal output from the differential amplification circuit 19 with a predetermined amplification rate and outputs the signal to the AD converter 12.

The AD converter 12 inputs through the input terminal 31 to the DSP 10 a digital signal acquired by performing the analog-digital conversion process for the audio signal from the amplification circuit 17. The digital signal input to the input terminal 31 is output from the output terminal 34. The digital signal output from the DSP 10 is input through the output terminal 34 to the DA converter 15. The DA converter 15 outputs an analog signal acquired by performing the digital-analog conversion process for the digital signal.

Figure 2:
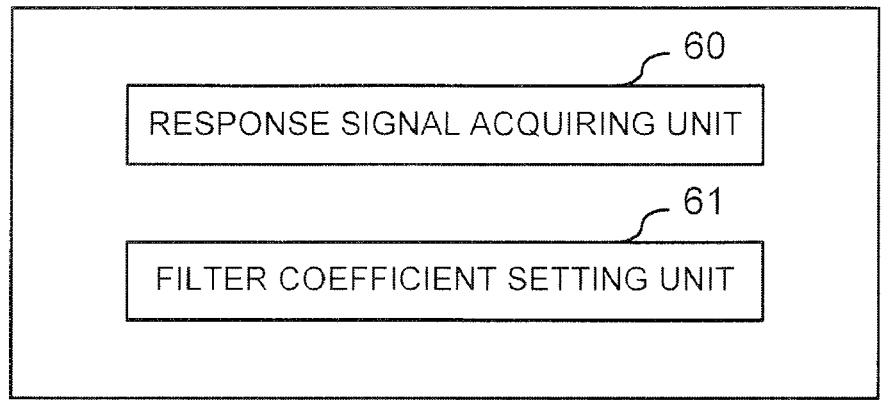
FIG. 2 depicts a configuration of a functional block realized by a DSP core executing a program.

The DSP core 40 (processor) can perform various processes in the DSP 10 by executing the program stored in the memory 41. FIG. 2 depicts a configuration of a functional block realized by the DSP core 40 executing the program. The DSP 10 includes a response signal acquiring unit 60 and a filter coefficient setting unit 61.

The response signal acquiring unit 60 acquires an impulse response IR1'(Z) (first response signal) of a path A shown by a solid line of FIG. 1 from the signal input from the input terminal 31 when an impulse (first signal) is output from the output terminal 32. The response signal acquiring unit 60 also acquires an impulse response IR2'(Z) (second response signal) of a path B shown by a solid line of FIG. 1 from the signal input from the input terminal 31 when an impulse (second signal) is output from the output terminal 33.

The filter coefficient setting unit 61 sets the filter coefficients of the FIR filter 51 based on the impulse response IR1'(Z) acquired. The filter coefficient setting unit 61 sets the filter coefficients of the FIR filter 50 based on the impulse response IR2'(Z) acquired.

In this embodiment, "impulse learning" indicates a series of processes of acquiring the impulse responses IR1'(Z) and IR2'(Z) and setting the filter coefficients of the FIR filters 50, 51 based on the acquired impulse responses IR1'(Z) and IR2'(Z).

The differential amplification circuit 19 and the amplification circuit 17 can switch gains based on a gain switching signal input from the CPU 2. For example, the differential amplification circuit 19 and the amplification circuit 17 sets the gain to a first gain in response to a control signal (first control signal) output from the CPU 2 before acquiring the impulse responses IR1'(Z) and IR2'(Z) and sets the gain to a second gain in response to a control signal (second control signal) output from the CPU 2 after acquiring the impulse responses IR1'(Z) and IR2'(Z). The first gain is a small gain that causes no overflow in the AD converter 12 even when a large impulse is input to reduce vulnerability to circuit noises and background noises. The second gain is a gain that can sufficiently amplify a weak signal input from the earphone microphone 5.

Although the control signal for switching the gains is output from the CPU 2 in this embodiment, the control signal may be output from the DSP 10. In this case, the DSP 10 includes a controlling unit realized by the DSP core 40 executing the program stored in the memory 41. The control unit outputs the control signal (first control signal) for setting the gain of the differential amplification circuit 19 and the amplification circuit 17 to the first gain before acquiring the impulse responses IR1'(Z) and IR2'(Z) and outputs the control signal (second control signal) for setting the gain of the differential amplification circuit 19 and the amplification circuit 17 to the second gain after acquiring the impulse responses IR1'(Z) and IR2'(Z).

==Principle of Echo Cancellation==

Principle of echo cancellation in the echo prevention circuit 1 will be described. It is assumed that IR1(Z) is an impulse response (transfer function) from the output terminal 32 to the + input terminal of the differential amplification circuit 19, which is shown by a dash line of FIG. 1. It is also assumed that IR2(Z) is an impulse response (transfer function) from the output terminal 33 to the − input terminal of the differential amplification circuit 19, which is shown by a dash line of FIG. 1. It is also assumed that W(Z) is an impulse response (transfer function) from the subsequent stage of the + and − input terminals of the differential amplification circuit 19 to the input terminal 31, which is shown by a dash line of FIG. 1.

In this case, the impulse response (transfer function) IR1'(Z) of the path A shown by the solid line of FIG. 1 is IR1'(Z)= IR1 (Z)·W (Z). The impulse response (transfer function) IR2'(Z) of the path B shown by the solid line of FIG. 1 is IR2'(Z)= −IR2(Z)·W(Z). The phase of IR2(Z) is inverted because IR2(Z) is input to the − input terminal of the differential amplification circuit 19.

Assuming that the filter coefficients of the FIR filter 50 are −IR2'(Z), which is a phase-inverted version of IR2'(Z), a characteristic IRall_1(Z) from the input of the FIR filter 50 to the input terminal 31 is as follows:

$$IRall\_1(Z) = -IR2'(Z) \cdot IR1'(Z)$$
$$= (-(-IR2(Z) \cdot W(Z)) \cdot (IR1(Z) \cdot W(Z))$$
$$= IR2(Z) \cdot W(Z) \cdot IR1(Z) \cdot W(Z)$$

Assuming that the filter coefficients of the FIR filter 51 are IR1'(Z), a characteristic IRall_2(Z) from the input of the FIR filter 51 to the input terminal 31 is as follows:

$$IRall\_2(Z) = IR1'(Z) \cdot IR2'(Z)$$
$$= IR1(Z) \cdot W(Z) \cdot (-IR2(Z) \cdot W(Z))$$
$$= IR1(Z) \cdot W(Z) \cdot (-IR2(Z) \cdot W(Z))$$
$$= -IRall\_1(Z)$$

That is, it is known that the characteristic IRall_1(Z) from the input of the FIR filter 50 to the input terminal 31 and the characteristic IRall_2(Z) from the input of the FIR filter 51 to the input terminal 31 are characteristics canceling each other. Therefore, it is known that the filter coefficients of the FIR filter 50 may be set to −IR2'(Z), which is a phase-inverted version of IR2'(Z), and that the filter coefficients of the FIR filter 51 may be set to IR1'(Z).

Alternatively, assuming that the filter coefficients of the FIR filter 50 are IR2'(Z), the characteristic IRall_1(Z) from the input of the FIR filter 50 to the input terminal 31 is as follows:

$$IRall\_1(Z) = IR2'(Z) \cdot IR1'(Z)$$
$$= (-IR2(Z) \cdot W(Z)) \cdot (IR1(Z) \cdot W(Z))$$
$$= IR2(Z) \cdot W(Z) \cdot IR1(Z) \cdot W(Z)$$

Assuming that the filter coefficients of the FIR filter 51 are −IR1'(Z), which is a phase-inverted version of IR1'(Z), the characteristic IRall_2(Z) from the input of the FIR filter 51 to the input terminal 31 is as follows:

$$IRall\_2(Z) = -IR1'(Z) \cdot IR2'(Z)$$
$$= (-(IR1(Z) \cdot W(Z))) \cdot (-IR2(Z) \cdot W(Z))$$
$$= IR1(Z) \cdot W(Z) \cdot IR2(Z) \cdot W(Z)$$
$$= -IRall\_1(Z)$$

That is, it is known that the characteristic IRall_1(Z) from the input of the FIR filter 50 to the input terminal 31 and the characteristic IRall_2(Z) from the input of the FIR filter 51 to the input terminal 31 are characteristics canceling each other. Therefore, it is known that the filter coefficients of the FIR filter 50 may be set to IR2'(Z) and that the filter coefficients of the FIR filter 51 may be set to −IR1'(Z), which is a phase-inverted version of IR1'(Z).

By setting the filter coefficients of the FIR filters 50, 51 in this way, the signal transmitted through the path A can be cancelled with the signal transmitted through the path B in the differential amplification circuit 19. As a result, the echo can be prevented when digital signals are input to the input terminal 30.

As shown in FIG. 1, by acquiring the impulse response IR1'(Z) with the earphone microphone 5 connected to set this IR1'(Z) as the filter coefficients of the FIR filter 51, the echo can be prevented effectively depending on transfer characteristics of the earphone microphone 5. By acquiring the impulse response IR1'(Z) with the connected earphone microphone 5 worn by inserting in the ear or covering the auricle to set this IR1'(Z) as the filter coefficients of the FIR filter 51, the echo can be prevented effectively depending on transfer characteristics of the earphone microphone 5 and transfer characteristics in the ear of the user. The filter coefficients of the FIR filter 51 can be set based on the impulse response IR1'(Z) that is acquired while the earphone microphone 5 is not connected.

==Configuration of Amplification Circuit==

Figure 3:
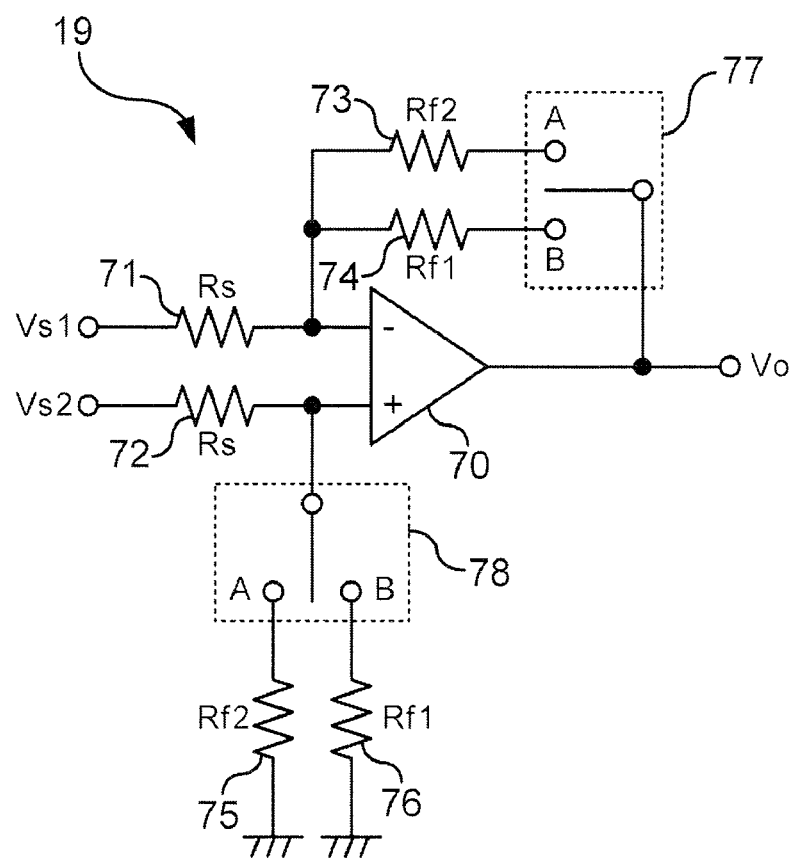
FIG. 3 depicts a configuration example of a differential amplification circuit 19.

Configurations of the differential amplification circuit 19 and the amplification circuit 17 will be described. FIG. 3 depicts a configuration example of the differential amplification circuit 19. The differential amplification circuit 19 includes an operational amplifier 70, resistors 71 to 76, and switches 77, 78. In this example, Vs1 represents a signal input to the − input terminal of the differential amplification circuit 19; Vs2 represents a signal input to the + input terminal of the differential amplification circuit 19; and Vo represents a signal output from the differential amplification circuit 19.

The signal Vs1 is input to the − input terminal of the operational amplifier 70 through the resistor 71 and the signal Vs2 is input to the + input terminal of the operational amplifier 70 through the resistor 72.

The resistors 73, 74 are connected in parallel via the switch 77 between the − input terminal and the output terminal of the operational amplifier 70. This switch 77 electrically connects the resistor 73 to the output terminal of the operational amplifier 70 (switches to A) in response to the control signal (first control signal) output from the CPU 2 before acquiring the impulse responses IR1'(Z) and IR2'(Z) and electrically connects the resistor 74 to the output terminal of the operational amplifier 70 (switches to B) in response to the control signal (second control signal) output from the CPU 2 after acquiring the impulse responses IR1'(Z) and IR2'(Z).

The + input terminal of the operational amplifier 70 is connected via the switch 78 to the resistors 75, 76 having one ends grounded. This switch 78 electrically connects the resistor 75 to the + input terminal of the operational amplifier 70 (switches to A) in response to the control signal (first control signal) output from the CPU 2 before acquiring the impulse responses IR1'(Z) and IR2'(Z) and electrically connects the resistor 76 to the + input terminal of the operational amplifier 70 (switches to B) in response to the control signal (second control signal) output from the CPU 2 after acquiring the impulse responses IR1'(Z) and IR2'(Z).

It is assumed that Rs, Rf1, and Rf2 (<Rf1) are the resistance value of the resistors 71, 72, the resistance value of the resistors 74, 76, and the resistance value of the resistors 73, 75, respectively. When the control signal (first control signal) before acquiring the impulse responses IR1'(Z) and IR2'(Z) is input to the differential amplification circuit 19, the switches 77, 78 are switched to A and Vo=(Rf2/Rs)×(Vs2−Vs1) is satisfied. When the control signal (second control signal) after acquiring the impulse responses IR1'(Z) and IR2'(Z) is input to the differential amplification circuit 19, the switches 77, 78 are switched to B and Vo=(Rf1/Rs)×(Vs2−Vs1) is satisfied. That is, when acquiring the impulse responses IR1'(Z) and IR2'(Z), a small gain Rf2/Rs (first gain) is generated, and after acquiring the impulse responses IR1'(Z) and IR2'(Z), a large gain Rf1/Rs (second gain) is generated.

Figure 4:
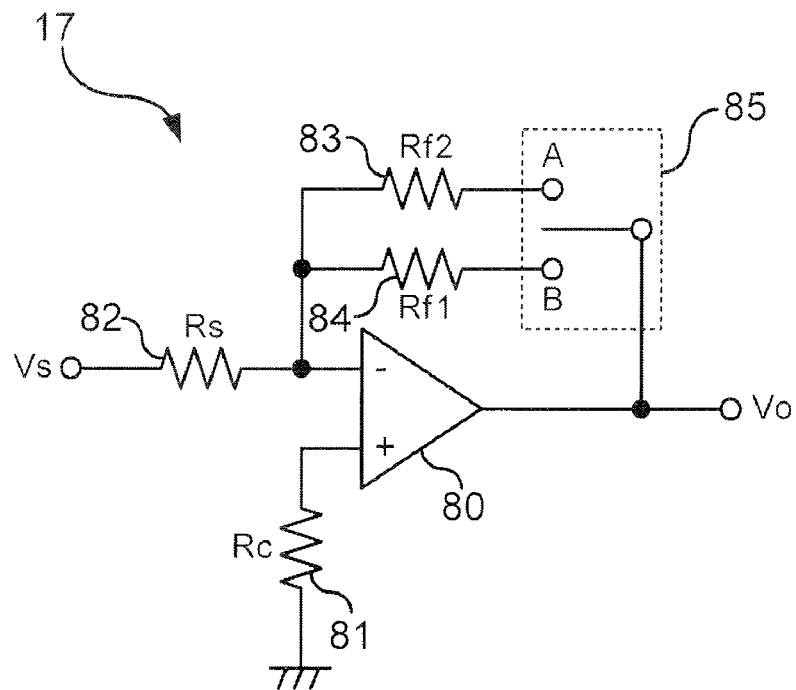
FIG. 4 depicts a configuration example when an amplification circuit 17 is an inverting amplification circuit.

FIG. 4 depicts a configuration example when the amplification circuit 17 is an inverting amplification circuit. The amplification circuit 17 includes an operational amplifier 80, resistors 81 to 84, and a switch 85. In this example, Vs represents a signal input to the amplification circuit 17 and Vo represents a signal output from the amplification circuit 17.

The + input terminal of the operational amplifier 80 is grounded via the resistor 81. The signal Vs is input via the resistor 82 to the − input terminal of the operational amplifier 80.

The resistors 83, 84 are connected in parallel via the switch 85 between the − input terminal and the output terminal of the operational amplifier 80. This switch 85 electrically connects the resistor 83 to the output terminal of the operational amplifier 80 (switches to A) in response to the control signal (first control signal) output from the CPU 2 before acquiring the impulse responses IR1'(Z) and IR2'(Z) and electrically connects the resistor 84 to the output terminal of the operational amplifier 80 (switches to B) in response to the control signal (second control signal) output from the CPU 2 after acquiring the impulse responses IR1'(Z) and IR2'(Z).

It is assumed that Rc, Rs, Rf1, and Rf2 (<Rf1) are the resistance value of the resistor 81, the resistance value of the resistor 82, the resistance value of the resistor 84, and the resistance value of the resistor 83, respectively. When the control signal (first control signal) before acquiring the impulse responses IR1'(Z) and IR2'(Z) is input to the amplification circuit 17, the switch 85 is switched to A and Vo=−(Rf2/Rs)×Vs is satisfied. When the control signal (second control signal) after acquiring the impulse responses IR1'(Z) and IR2'(Z) is input to the amplification circuit 17, the switch 85 is switched to B and Vo=−(Rf1/Rs)×Vs is satisfied. That is, when acquiring the impulse responses IR1'(Z) and IR2'(Z), the small gain Rf2/Rs (first gain) is generated, and after acquiring the impulse responses IR1'(Z) and IR2'(Z), the large gain Rf1/Rs (second gain) is generated.

Figure 5:
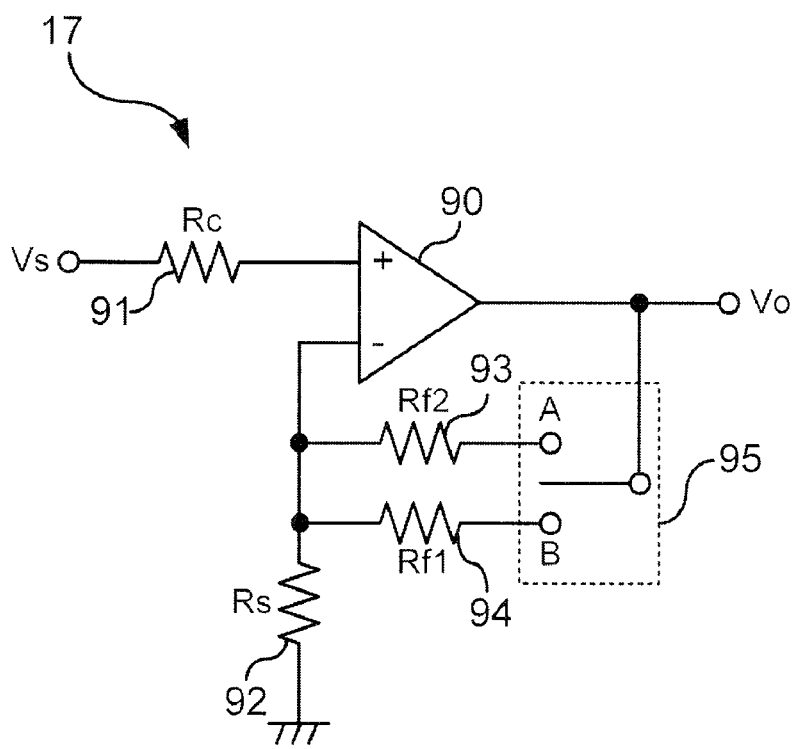
FIG. 5 depicts a configuration example when the amplification circuit 17 is a non-inverting amplification circuit.

FIG. 5 depicts a configuration example when the amplification circuit 17 is a non-inverting amplification circuit. The amplification circuit 17 includes an operational amplifier 90, resistors 91 to 89, and a switch circuit 95. In this example, Vs represents a signal input to the amplification circuit 17 and Vo represents a signal output from the amplification circuit 17.

The signal Vs is input via the resistor 91 to the + input terminal of the operational amplifier 90. The − input terminal of the operational amplifier 90 is grounded via the resistor 92. The resistors 93, 94 are connected in parallel via the switch 95 between the − input terminal and the output terminal of the operational amplifier 90. This switch 95 electrically connects the resistor 93 to the output terminal of the operational amplifier 90 (switches to A) in response to the control signal (first control signal) output from the CPU 2 before acquiring the impulse responses IR1'(Z) and IR2'(Z) and electrically connects the resistor 94 to the output terminal of the operational amplifier 90 (switches to B) in response to the control signal (second control signal) output from the CPU 2 after acquiring the impulse responses IR1'(Z) and IR2'(Z).

It is assumed that Rc, Rs, Rf1, and Rf2 (<Rf1) are the resistance value of the resistor 91, the resistance value of the resistor 92, the resistance value of the resistor 94, and the resistance value of the resistor 93, respectively. When the control signal (first control signal) before acquiring the impulse responses IR1'(Z) and IR2'(Z) is input to the amplification circuit 17, the switch 95 is switched to A and Vo=(1+Rf2/Rs)×Vs is satisfied. When the control signal (second control signal) after acquiring the impulse responses IR1'(Z)

and IR2'(Z) is input to the amplification circuit 17, the switch 95 is switched to B and Vo=(1+Rf1/Rs)×Vs is satisfied. That is, when acquiring the impulse responses IR1'(Z) and IR2'(Z), the small gain 1+Rf2/Rs (first gain) is generated, and after acquiring the impulse responses IR1'(Z) and IR2'(Z), the large gain 1+Rf1/Rs (second gain) is generated.

The configurations shown in FIGS. 3 to 5 are examples and are not limitations of the configuration of the amplification circuit that can adjust the gain. Although both the differential amplification circuit 19 and the amplification circuit 17 enable the switching of the gain in the examples of the configurations shown in this embodiment, only one of the differential amplification circuit 19 and the amplification circuit 17 may enable the switching of the gain.

==Filter Coefficient Setting Process==

Figure 6:
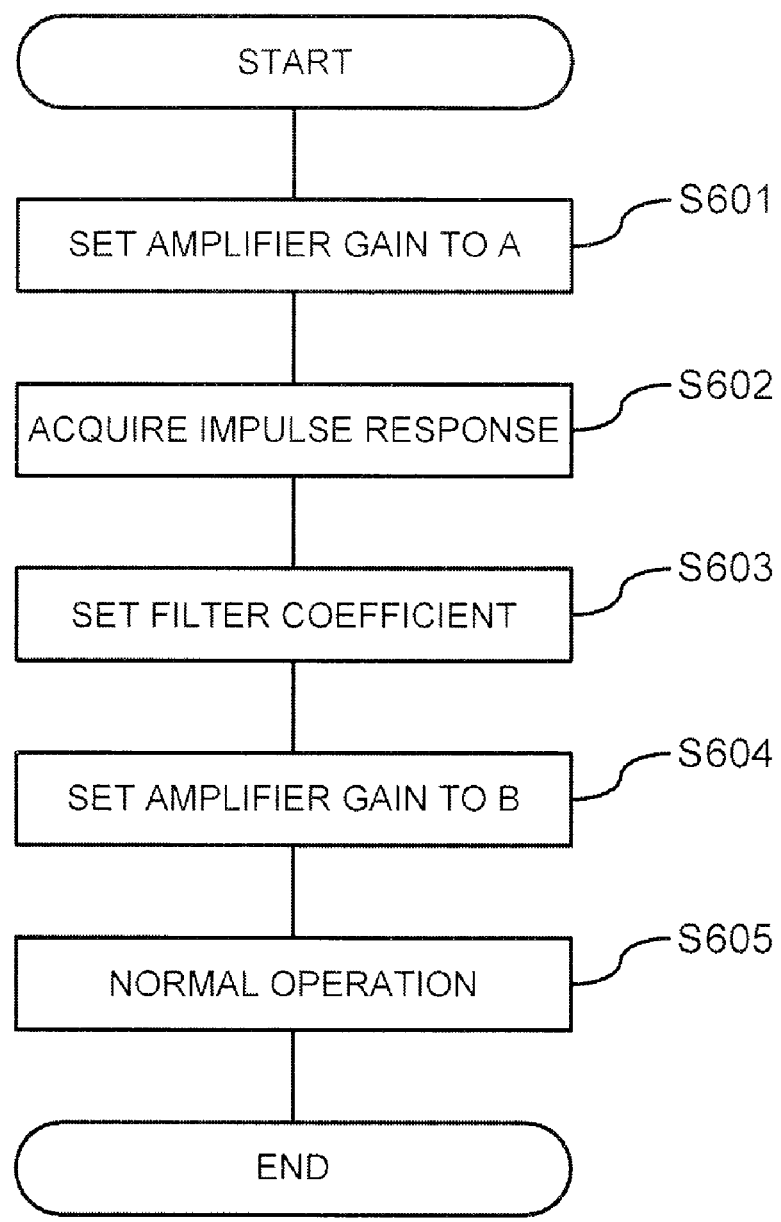
FIG. 6 is a flowchart of a first example of a filter coefficient setting process.

The filter coefficient setting process in the echo prevention circuit 1 will be described. FIG. 6 is a flowchart of a first example of the filter coefficient setting process. First, for example, at the time of power-on, the CPU 2 outputs the control signal (first control signal) for setting the gain to A in the amplification circuit configured by the differential amplification circuit 19 and the amplification circuit 17 to the differential amplification circuit 19 and the amplification circuit 17. In response to this control signal, the gain is set to A in the amplification circuit configured by the differential amplification circuit 19 and the amplification circuit 17 (S601). Under the control of the CPU 2, the response signal acquiring unit 60 of the DSP 10 generates a large impulse that reduces vulnerability to circuit noises and background noises to acquire the impulse responses IR1'(Z) and IR2'(Z) (S602). The filter coefficient setting unit 61 of the DSP 10 sets the filter coefficients of the FIR filters 50, 51 based on the acquired impulse responses IR1'(Z) and IR2'(Z) (S603).

The CPU 2 then outputs the control signal (second control signal) for setting the gain to B, which is larger than A, in the amplification circuit configured by the differential amplification circuit 19 and the amplification circuit 17 to the differential amplification circuit 19 and the amplification circuit 17. In response to this control signal, the gain is set to B in the amplification circuit configured by the differential amplification circuit 19 and the amplification circuit 17 (S604). After the gain is set to B, the echo prevention circuit 1 performs the normal operation such as output of the audio signal to the earphone microphone 5, input of the audio signal from the earphone microphone 5, the echo prevention process, etc (S605).

The gain A is a small gain (e.g., about 20 dB) that does not make the signal output from the AD converter 12 overflow when generating the large impulse that reduces vulnerability to circuit noises and background noises. The gain B is the large gain (e.g., about 50 dB) that can sufficiently amplify the weak audio signal input from the earphone microphone 5.

By setting the small gain for the differential amplification circuit 19 and the amplification circuit 17 before acquiring the impulse responses IR1'(Z) and IR2'(Z), no overflow is generated in the AD converter 12 even when inputting the large impulse having resistance to circuit noises and background noises and therefore, highly accurate impulse responses can be acquired. By setting the filter coefficients of the FIR filters 50, 51 based on the highly accurate impulse responses, the echo can be cancelled effectively. By setting the large gain for the differential amplification circuit 19 and the amplification circuit 17 after acquiring the impulse responses IR1'(Z) and IR2'(Z), the weak audio signal input from the earphone microphone 5 can be amplified and output at an appropriate level.

Although the gain is changed under the control of the CPU 2 in this example, the gain may be changed under the control of the DSP core 40 (controlling unit).

Figure 7:
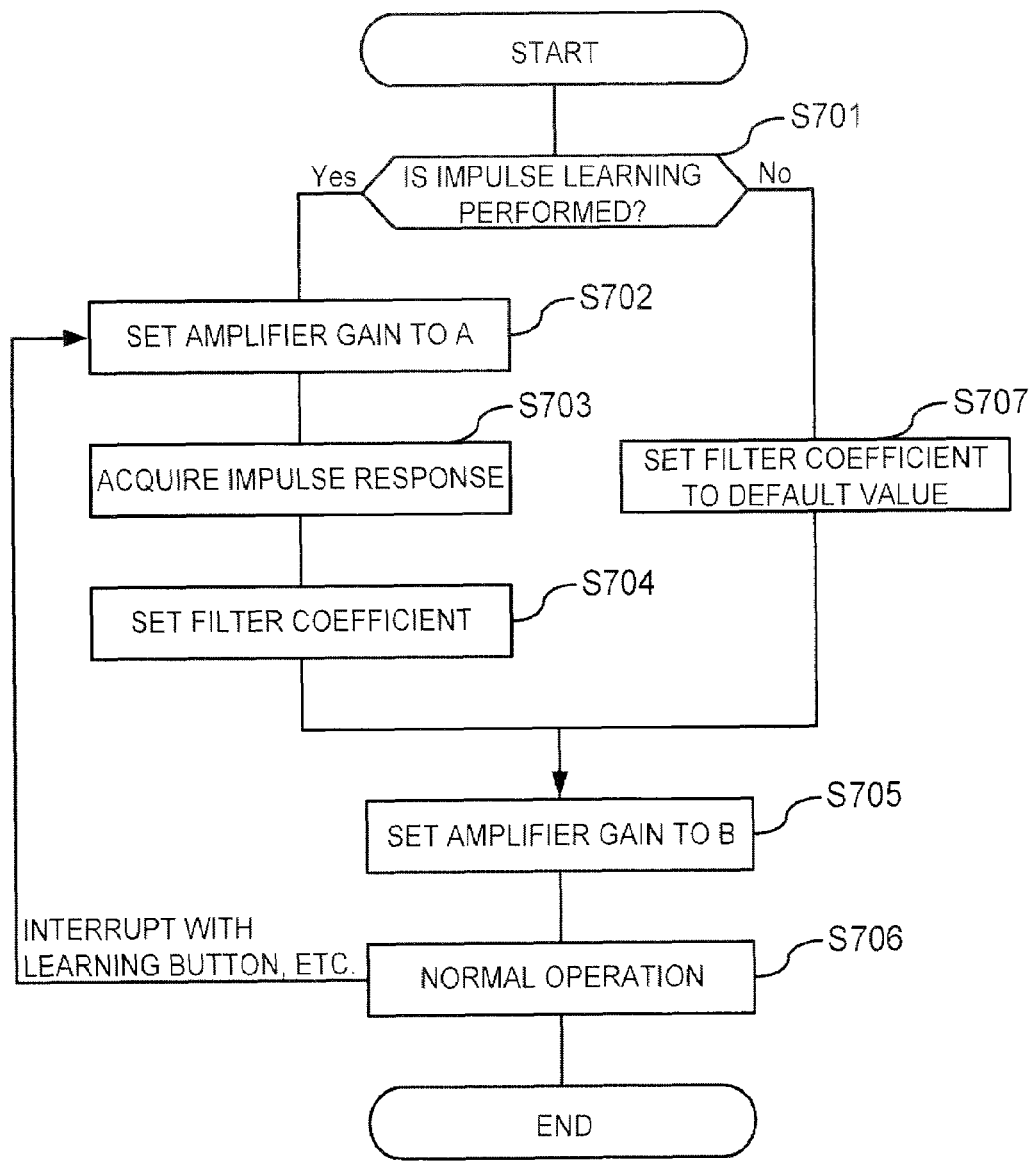
FIG. 7 is a flowchart of a second example of a filter coefficient setting process.

FIG. 7 is a flowchart of a second example of a filter coefficient setting process. In this example, for example, at the time of power-on, the CPU 2 determines whether the impulse learning is performed (S701). Whether the impulse learning is performed can be determined based on information stored in the memory 3, for example. This information can be stored in the memory 3 as the setting information of the system or can be information selected by a user through a user interface at the time of power-on, for example.

If the impulse learning is performed (S701: Yes), the CPU 2 outputs the control signal (first control signal) for setting the gain to A in the amplification circuit configured by the differential amplification circuit 19 and the amplification circuit 17 to the differential amplification circuit 19 and the amplification circuit 17. In response to this control signal, the gain is set to A in the amplification circuit configured by the differential amplification circuit 19 and the amplification circuit 17 (S702). Under the control of the CPU 2, the response signal acquiring unit 60 of the DSP 10 generates a large impulse that reduces vulnerability to circuit noises and background noises to acquire the impulse responses IR1'(Z) and IR2'(Z) (S703). The filter coefficient setting unit 61 of the DSP 10 sets the filter coefficients of the FIR filters 50, 51 based on the acquired impulse responses IR1'(Z) and IR2'(Z) (S704).

The CPU 2 then outputs the control signal (second control signal) for setting the gain to B, which is larger than A, in the amplification circuit configured by the differential amplification circuit 19 and the amplification circuit 17 to the differential amplification circuit 19 and the amplification circuit 17. In response to this control signal, the gain is set to B in the amplification circuit configured by the differential amplification circuit 19 and the amplification circuit 17 (S705). After the gain is set to B, the echo prevention circuit 1 performs the normal operation such as output of the audio signal to the earphone microphone 5, input of the audio signal from the earphone microphone 5, the echo prevention process, etc (S706).

On the other hand, if the impulse learning is not performed (S701: No), the filter coefficient setting unit 61 sets the filter coefficients of the FIR filters 50 and 51 to default values (predetermined values) in accordance with the instruction from the CPU 2. The default value is a factory default setting value, a previously acquired impulse response, etc., and can be stored in the nonvolatile memory 3 such as a flash memory, for example. The gain is then set to B in the amplification circuit configured by the differential amplification circuit 19 and the amplification circuit 17 (S705) and the echo prevention circuit 1 performs the normal operation (S706).

The impulse learning can be performed as needed based on the information stored in the memory 3, etc. Therefore, since the impulse learning is not performed when the impulse learning is not needed, the time required for enabling the normal operation can be reduced.

For example, if the learning button 4 is pressed down during the normal operation, the CPU 2 can control the switching of the gain and the impulse learning (S702 to S705) to be performed again. By enabling the impulse learning again during the normal operation, the filter coefficients of the FIR filters 50, 51 can be changed such that the echo can be cancelled effectively without rebooting when the earphone microphone 5 is changed or when the user of the earphone microphone 5 is changed.

Although the gain is changed and the filter coefficients are set under the control of the CPU 2 in this example, the gain may be changed and the filter coefficients are set under the control of the DSP core 40 (controlling unit). If the gain is changed under the control of the DSP core 40, a signal indicating the necessity of the impulse learning (response signal acquisition necessity signal) may be stored in the memory 41 (response signal acquisition necessity signal storage unit) and the DSP core 40 may determine the necessity of the impulse learning based on the information. By pressing the learning button 4, the CPU 2 may transmit a signal instructing the DSP core 40 to reset the filter coefficients of the FIR filters 50, 51, and the DSP core 40 (controlling unit) may control the switching of the gain and the impulse learning (S702 to S705) in response to this signal.

==Other Forms of Echo Prevention Circuit==

Figure 8:
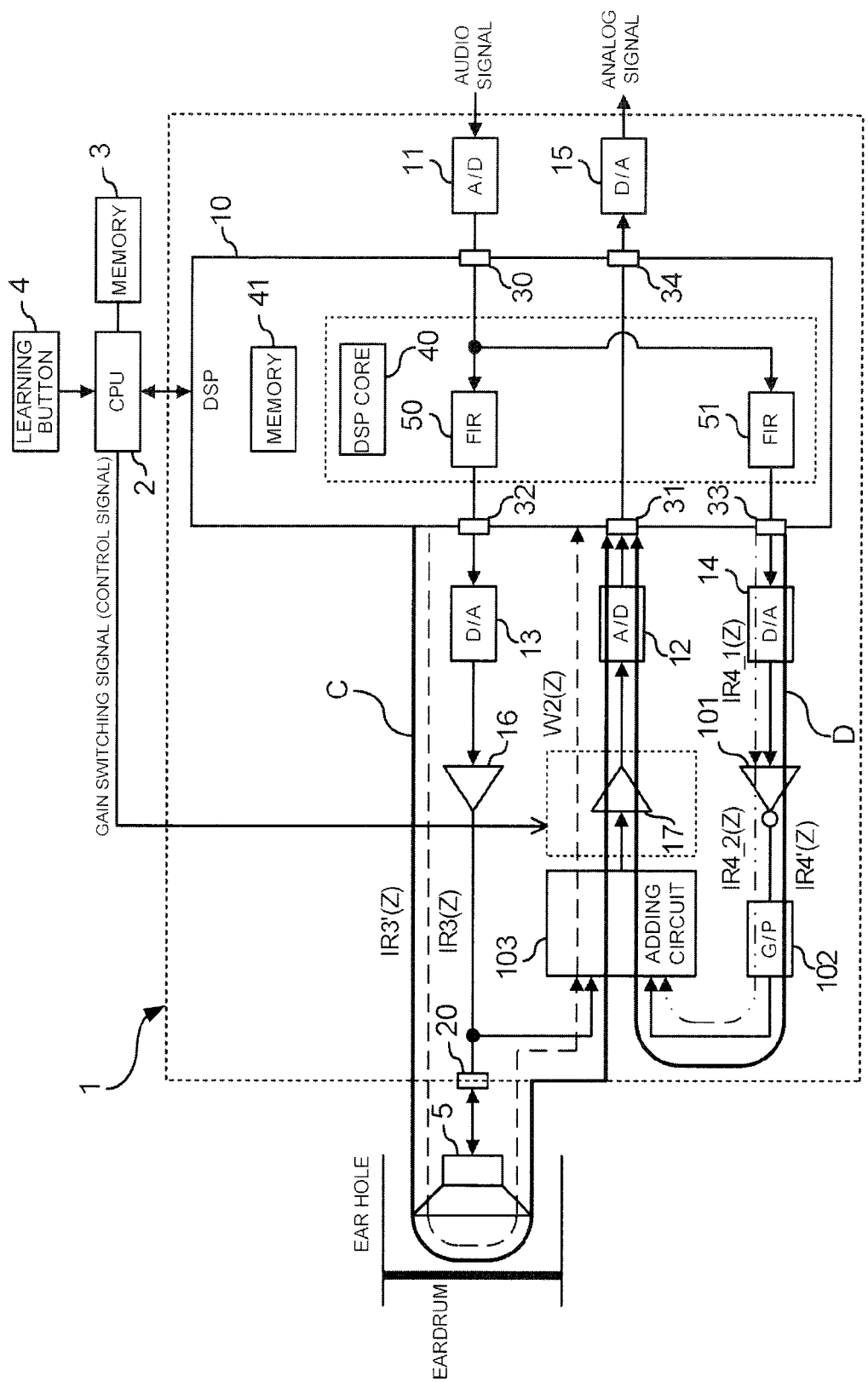
FIG. 8 depicts a configuration example of an echo prevention circuit using an adding circuit.

Other forms of the echo prevention circuit 1 will be described. FIG. 8 depicts a configuration example of an echo prevention circuit using an adding circuit. As shown in FIG. 8, the echo prevention circuit 1 includes an inverting amplification circuit 101, a gain/phase adjustment circuit 102, and an adding circuit 103, instead of the amplification circuit 18 and the differential amplification circuit 19.

The inverting amplification circuit 101 inverts and amplifies the analog signal from the DA converter 14 with a predetermined amplification rate and outputs the signal to the gain/phase adjustment circuit 102.

The gain/phase adjustment circuit 102 adjusts the gain and phase of the analog signal from the inverting amplification circuit 101 and outputs the signal to the adding circuit 103. To cancel the signal output from the amplification circuit 16 when the digital signal in input to the input terminal 30 in the adding circuit 103 described later, the adjustment of the gain an phase of the analog signal is performed by the gain/phase adjustment circuit 102 so as to generate an analog signal with phase inverted from the analog signal from the amplification circuit 16.

The adding circuit 103 receives input of the analog signal from the amplification circuit 16 (including the reflected signal from the earphone microphone 5) and the analog signal from the gain/phase adjustment circuit 102. The adding circuit 103 outputs to the amplification circuit 17 an addition result acquired by adding the analog signal from the amplification circuit 16 and the analog signal from the gain/phase adjustment circuit 102. The adding circuit 103 also outputs the audio signal from the input/output terminal 20 to the amplification circuit 17.

It is assumed that IR3(Z) is an impulse response (transfer function) from the output terminal 32 to the input terminal of the adding circuit 103, which is shown by a dash line of FIG. 8. It is also assumed that IR4_1(Z) is an impulse response (transfer function) from the output terminal 33 to the inverting amplification circuit 101, which is shown by a dot-and-dash line of FIG. 8. It is also assumed that IR4_2(Z) is an impulse response (transfer function) from the input of the inverting amplification circuit 101 to the input terminal of the adding circuit 103, which is shown by a double-dot-and-dash line of FIG. 8. It is also assumed that W2(Z) is an impulse response (transfer function) from the subsequent stage of each input terminal of the adding circuit 103 to the input terminal 31, which is shown by a dash line of FIG. 8.

In this case, the impulse response (transfer function) IR3'(Z) of a path C shown by the solid line of FIG. 8 is IR3'(Z)= IR3(Z)·W(Z). The impulse response (transfer function) IR4'(Z) of a path D shown by the solid line of FIG. 8 is IR4'(Z)= −IR4_1(Z)·IR4_2(Z)·W2(Z). The phase of IR4_1(Z) is inverted because the phase is inverted by the inverting amplification circuit 101.

Assuming that the filter coefficients of the FIR filter 50 are −IR4'(Z), which is a phase-inverted version of IR4'(Z), a characteristic IRall_3(Z) from the input of the FIR filter 50 to the input terminal 31 is as follows:

$$\text{IRall\_3}(Z) = -IR4'(Z) \cdot IR3'(Z)$$
$$= (-(-IR4\_1(Z) \cdot IR4\_2(Z) \cdot W2(Z))) \cdot (IR3(Z) \cdot W2(Z))$$
$$= IR4\_1(Z) \cdot IR4\_2(Z) \cdot W2(Z) \cdot IR3(Z) \cdot W2(Z)$$

Assuming that the filter coefficients of the FIR filter 51 are IR3'(Z), a characteristic IRall_4(Z) from the input of the FIR filter 51 to the input terminal 31 is as follows:

$$\text{IRall\_4}(Z) = IR3'(Z) \cdot IR4'(Z)$$
$$= IR3(Z) \cdot W2(Z) \cdot (-IR4\_1(Z) \cdot IR4\_2(Z) \cdot W2(Z))$$
$$= IR3(Z) \cdot W2(Z) \cdot (-IR4\_1(Z)) \cdot IR4\_2(Z) \cdot W2(Z)$$
$$= -\text{IRall\_3}(Z)$$

That is, it is known that the characteristic IRall_3(Z) from the input of the FIR filter 50 to the input terminal 31 and the characteristic IRall_4(Z) from the input of the FIR filter 51 to the input terminal 31 are characteristics canceling each other. Therefore, it is known that the filter coefficients of the FIR filter 50 may be set to −IR4'(Z), which is a phase-inverted version of IR4'(Z), and that the filter coefficients of the FIR filter 51 may be set to IR1'(Z).

Alternatively, assuming that the filter coefficients of the FIR filter 50 are IR4'(Z), the characteristic IRall_3(Z) from the input of the FIR filter 50 to the input terminal 31 is as follows:

$$\text{IRall\_3}(Z) = IR4'(Z) \cdot IR3'(Z)$$
$$= (-IR4\_1(Z) \cdot IR4\_2(Z) \cdot W2(Z)) \cdot (IR3(Z) \cdot W2(Z))$$
$$= -IR4\_1(Z) \cdot IR4\_2(Z) \cdot W2(Z) \cdot IR3(Z) \cdot W2(Z)$$

Assuming that the filter coefficients of the FIR filter 51 are −IR3'(Z), which is a phase-inverted version of IR3'(Z), the characteristic IRall_4(Z) from the input of the FIR filter 51 to the input terminal 31 is as follows:

$$\text{IRall\_4}(Z) = -IR3'(Z) \cdot IR4'(Z)$$
$$= -(IR3(Z) \cdot W2(Z)) \cdot (-IR4\_1(Z) \cdot IR4\_2(Z) \cdot W2(Z))$$
$$= IR3(Z) \cdot W2(Z) \cdot IR4\_1(Z) \cdot IR4\_2(Z) \cdot W2(Z)$$
$$= -\text{IRall\_3}(Z)$$

That is, it is known that the characteristic IRall_3(Z) from the input of the FIR filter 50 to the input terminal 31 and the characteristic IRall_4(Z) from the input of the FIR filter 51 to the input terminal 31 are characteristics canceling each other. Therefore, it is known that the filter coefficients of the FIR filter 50 may be set to IR4'(Z) and that the filter coefficients of the FIR filter 51 may be set to −IR3'(Z), which is a phase-inverted version of IR3'(Z).

By setting the filter coefficients of the FIR filters 50, 51 in this way, the signal transmitted through the path C can be cancelled with the signal transmitted through the path D in the adding circuit 103. As a result, the echo can be prevented when digital signals are input to the input terminal 30.

In the configuration shown in FIG. 8, the subtracting circuit of the present invention is configured by the inverting amplification circuit 101, the gain/phase adjustment circuit 102, and the adding circuit 103. The amplification 17 corresponds to the amplification circuit of the present invention.

Figure 9:
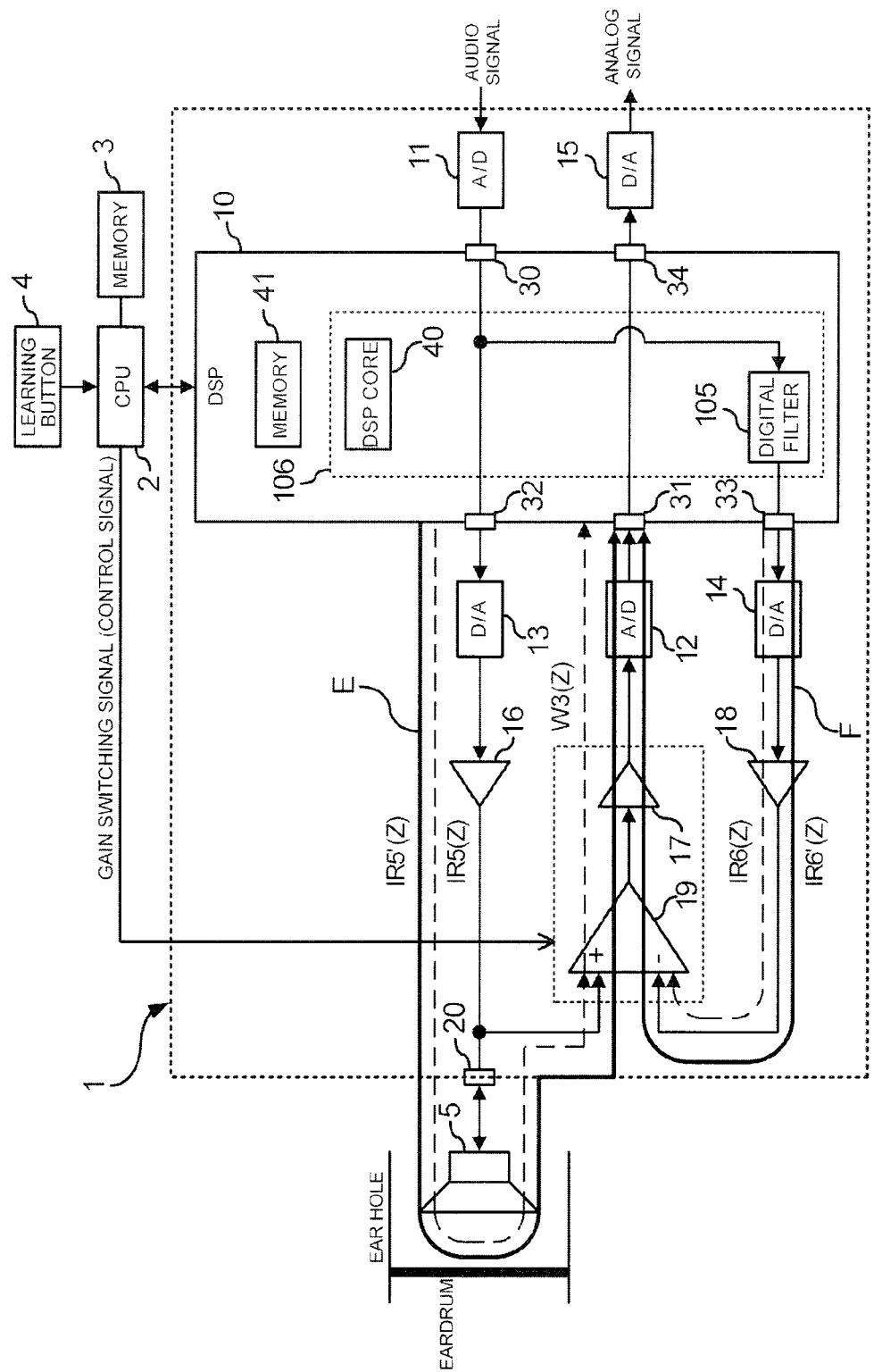
FIG. 9 depicts a configuration example of an echo prevention circuit using a digital filter (ARMA)

FIG. 9 depicts a configuration example of an echo prevention circuit using a digital filter (ARMA: Auto-Regressive Moving Average). As shown in FIG. 9, the echo prevention circuit 1 includes a digital filter (ARMA) 105 instead of the FIR filters 50, 51 shown in FIG. 1.

The digital signal input from the input terminal 30 is output via the output terminal 32 and is input to the digital filter 105. The digital filter 105 performs a filter process for the digital signal based on the filter coefficients of the digital filter 105 and outputs the signal to the output terminal 33. The digital filter 105 can be realized by the DSP core 40 executing the program stored in the memory 41. A filter of the present invention corresponds to the function of outputting a digital signal (second digital signal) from the output terminal 32 and outputting a digital signal (third digital signal) from the output terminal 33 when a digital signal (first digital signal) is input to the input terminal 30, which is realized by the DSP core 40.

It is assumed that IR5(Z) is an impulse response (transfer function) from the output terminal 32 to the + input terminal of the differential amplification circuit 19, which is shown by a dash line of FIG. 9. It is also assumed that IR6(Z) is an impulse response (transfer function) from the output terminal 33 to the − input terminal of the differential amplification circuit 19, which is shown by a dash line of FIG. 9. It is also assumed that W3(Z) is an impulse response (transfer function) from the subsequent stage of the + and − input terminals of the differential amplification circuit 19 to the input terminal 31, which is shown by a dash line of FIG. 9.

Assuming that the filter coefficients of the digital filter 105 are Q(Z), to cancel the signal input to the + input terminal of the differential amplification circuit 19 with the signal input to the − input terminal, Q(Z) is provided so as to satisfy the following equation.

$$IR5(Z)=IR6(Z) \cdot Q(Z)$$

That is, Q(Z) may be provided as follows.

$$Q(Z)=IR5(Z)/IR6(Z)$$

However, the acquirable impulse responses of the response signal acquiring unit 60 of the DSP 10 are an impulse response (transfer function) IR5'(Z)(=IR5(Z)·W3(Z)) of a path E shown by a solid line of FIG. 9 and an impulse response (transfer function) IR6'(Z)(=−IR6(Z)·W3(Z)) of a path F. The phase of IR6(Z) is inverted because IR6(Z) is input to the − input terminal of the differential amplification circuit 19.

In this case, the following equation enables the signal transmitted through the path E and the signal transmitted through the path F to cancel each other.

$$-IR5'(Z)=IR6'(Z) \cdot Q(Z)$$

That is, it is known that Q(Z) may be provided as follows.

$$Q(Z)=-IR5'(Z)/IR6'(Z)$$

That is, the characteristic of the digital filter 105 can be realized as a characteristic acquired by adding the characteristic of the inverted filter of IR6'(Z) to the transfer characteristic IR5'(Z) with the phase inverted. By setting the filter coefficients of the digital filter 105 in this way with the filter coefficients setting unit 61 of the DSP 10, the signal transmitted through the path E can be canceled with the signal transmitted through the path F in the differential amplification circuit 19. As a result, the echo can be prevented when digital signals are input to the input terminal 30.

==Application Examples of Echo Prevention Circuit==

Figure 10:
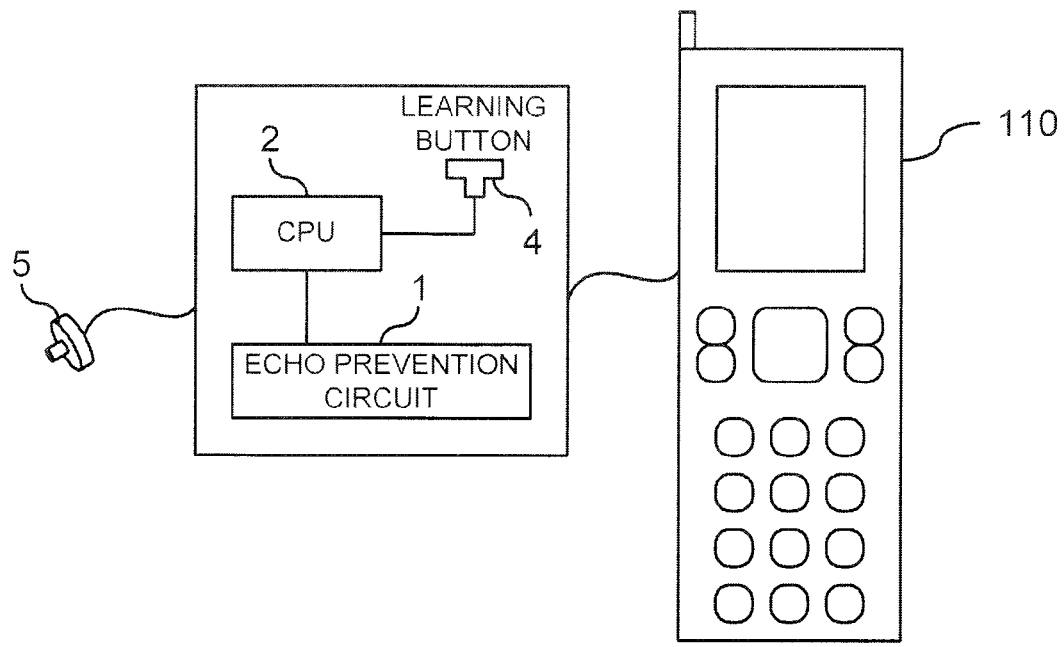
FIG. 10 is a diagrammatic view of a mobile phone connected externally to the echo prevention circuit.
Figure 11:
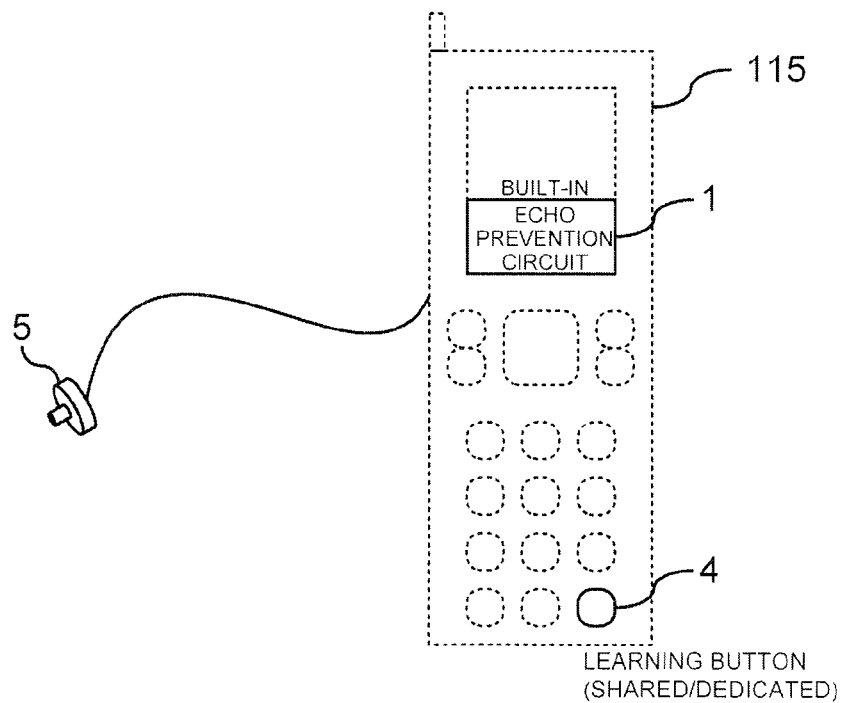

Application examples of the echo prevention circuit 1 will be described. FIGS. 10 and 11 are diagrammatic views of a mobile phone to which the echo prevention circuit 1 is applied. In the configuration shown in FIG. 10, the echo prevention circuit 1 is disposed on the outside of a mobile phone 110. In the configuration shown in FIG. 11, the echo prevention circuit 1 is built into a mobile phone 115. If the echo prevention circuit 1 is built into the mobile phone 115, the learning button 4 is also disposed on the mobile phone 115. In this case, the learning button 4 may be disposed as a dedicated button or may also be used as a button with another function.

Figure 12:
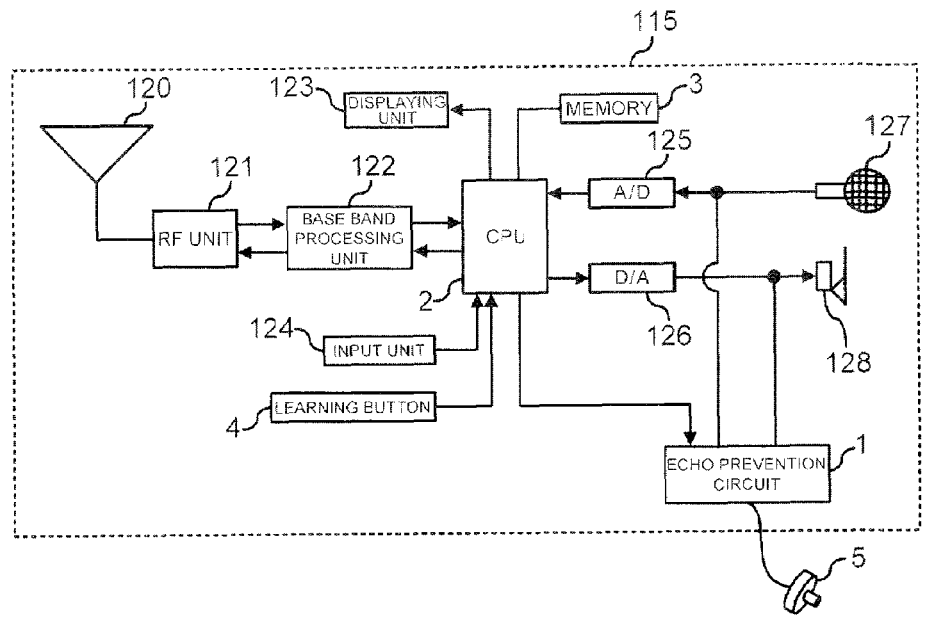

FIG. 12 depicts a configuration example of the mobile phone 115 having the echo prevention circuit 1 built-in. The mobile phone 115 includes the echo prevention circuit 1, the CPU 2, the memory 3, the learning button 4, an antenna 120, an RF unit 121, a base band processing unit 122, a displaying unit 123, an input unit 124, an AD converter 125, a DA converter 126, a microphone 127, and a speaker 128.

The antenna 120 receives audio signals transmitted to the mobile phone 115. The antenna 120 transmits audio signals from the RF unit 121.

The RF unit 121 performs a decode process such as a demodulation process for audio signals in a predetermined frequency band among the audio signals received with the antenna 120. The RF unit 121 performs a demodulation process, for example, an encode process in the TDMA (Time Division Multiplex Access) mode, for the audio signals from the base band processing unit 122.

The base band unit 122 performs a predetermined signal process for the audio signal demodulated to a base band signal in the RF unit 121 and outputs the signal to the CPU 2. The base band unit 122 performs a predetermined signal process for the audio signal the CPU 2 and outputs the signal to the RF unit 121.

The CPU 2 performs overall control of the mobile phone 115. To reproduce a sound corresponding to the audio signal from the base band processing unit 122 with the speaker 128 or the earphone microphone 5, the CPU 2 outputs the audio signal to the DA converter 126. The CPU 2 also outputs to the base band processing unit 122 the audio signal from the microphone 127 or the earphone microphone 5, which is output from the AD converter 125. For example, if the mobile phone 115 performs the packet communication, the CPU 2 outputs signals to the displaying unit 123 to display an image based on the received packed data. The CPU 2 displays input data input from the input unit 124 on the displaying unit 123 and performs a predetermined process and outputs the input data to the base band processing unit 122 to transmit the input data in the packet communication.

The CPU 2 allows the echo prevention circuit 1 to perform the filter coefficient setting process when the mobile phone 115 is powered on or when the learning button 4 is pressed down. In this situation, as shown in FIGS. 6 and 7, the impulse responses are acquired while the small gain (A, e.g., 20 dB) is established, and the large gain (B, e.g., 50 dB) is subsequently established.

The AD converter 125 outputs to the CPU 2 the digital signal acquired by performing the analog-digital conversion process for the audio signal from the microphone 127 or the earphone microphone 5. The DA converter 126 outputs to the speaker 128 or the echo prevention circuit 1 the analog signal acquired by performing the digital-analog conversion process for the audio signal from the CPU 2. In the following description of this embodiment, when the earphone microphone 5 is connected to the mobile phone 115, the analog signal from the DA converter 126 is assumed to be input to the echo prevention circuit 1.

The operation of the mobile phone 115 will be described. It is assumed that the echo prevention circuit 1 has the configuration shown in FIG. 1. When the mobile phone 115 is powered on, the above process of FIG. 7 is started. That is, due to the power-on, the filter coefficients of the FIR filters 50, 51 are set in the echo prevention circuit 1 and the normal operation state is established.

In the normal operation state, each constituent element of the mobile phone 115 performs the above process, and the audio signal received by the antenna 120 is output from the DA converter 126 to the AD converter 11 of the echo prevention circuit 1.

The audio signal input to the AD converter 11 is converted to a digital signal in the analog-digital signal process of the AD converter 11 and the digital signal is input to the FIR filters 50, 51 via the input terminal 30. The output signal output from the FIR filter 50 is input to the DA converter 13 via the output terminal 32. The output signal is converted to an analog signal in the digital-analog conversion process of the DA converter 13, and the analog signal is input to the amplification circuit 16. The analog signal input to the amplification circuit 16 is amplified with a predetermined amplification rate to be output. The analog signal from the amplification circuit 16 is output to the earphone microphone 5 via the input/output terminal 20. As a result, the vibration plate is vibrated to generate a sound due to the speaker function of the earphone microphone 5. The analog signal from the amplification circuit 16 is also input to the + input terminal of the differential amplification circuit 19.

The output signal output from the FIR filter 51 is input to the DA converter 14 via the output terminal 33. The output signal is converted to an analog signal in the digital-analog conversion process of the DA converter 14, and the analog signal is input to the amplification circuit 18. The analog signal input to the amplification circuit 18 is amplified with a predetermined amplification rate and is output to the -input terminal of the differential amplification circuit 19.

The filter coefficients of the FIR filters 50, 51 are set in accordance with the above process. Therefore, the differential amplification circuit 19 can cancel the signal generated by combining an analog signal (first analog signal) output from the amplification circuit 16 and the reflected signal of the analog signal from the earphone microphone 5, etc., which is input to the + input terminal, with the analog signal (second analog signal) from the amplification circuit 18, which is input to the – input terminal. As a result, the echo can be prevented when digital signals are input to the input terminal 30. If the audio signal (third analog signal) from the microphone function of the earphone microphone 5 is overlapped with the signal generated by combining an analog signal (first analog signal) from the amplification circuit 16 and the reflected signal of the analog signal from the earphone microphone 20 and is input to the + input terminal of the differential amplification circuit 19, the signals causing the echo (i.e., the analog signal from the amplification circuit 16 and the reflected signal of the analog signal) can be subtracted from the overlapping signals by inputting the signal (second analog signal) from the FIR filter 51 to the – input terminal.

In the case where the filter coefficients of the FIR filter 51 is set based on the impulse response IR1'(Z) that is acquired while the earphone microphone 20 is not connected, the differential amplifying circuit 12 can cancel the analog signal (the first anlog signal) outputted from the amplifying circuit 9 using the analog signal (the second analog signal) outputted from the amplifying circuit 11.

However, as described in the embodiment, by setting the filter coefficients of the FIR filter 51 based on the impulse response IR1'(Z) that is acquired while the earphone microphone 20 is connected, the differential amplifying circuit 12 can cancel not only the analog signal (the first analog signal) outputted from the amplifying circuit 9 but also the reflected signal of the analog signal reflected by the earphone microphone 20, etc., and therefore echoes can be canceled with high precision.

Although the configuration and operation has been described with regard to the mobile phone 115 having the echo prevention circuit 1 built-in, the same applies to the mobile phone 110 externally connected to the echo prevention circuit 1.

Figure 13:
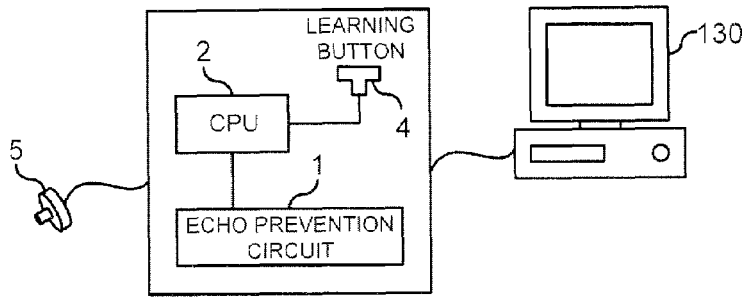
FIG. 13 depicts an example of a PC to which the echo prevention circuit is applied.
Figure 14:
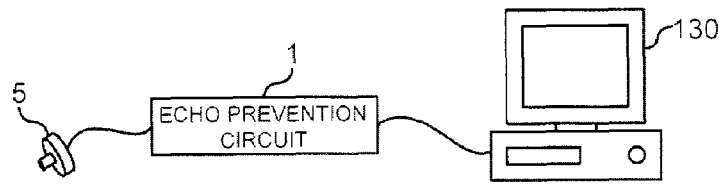
FIG. 14 depicts another example of a PC to which the echo prevention circuit is applied.
Figure 15:
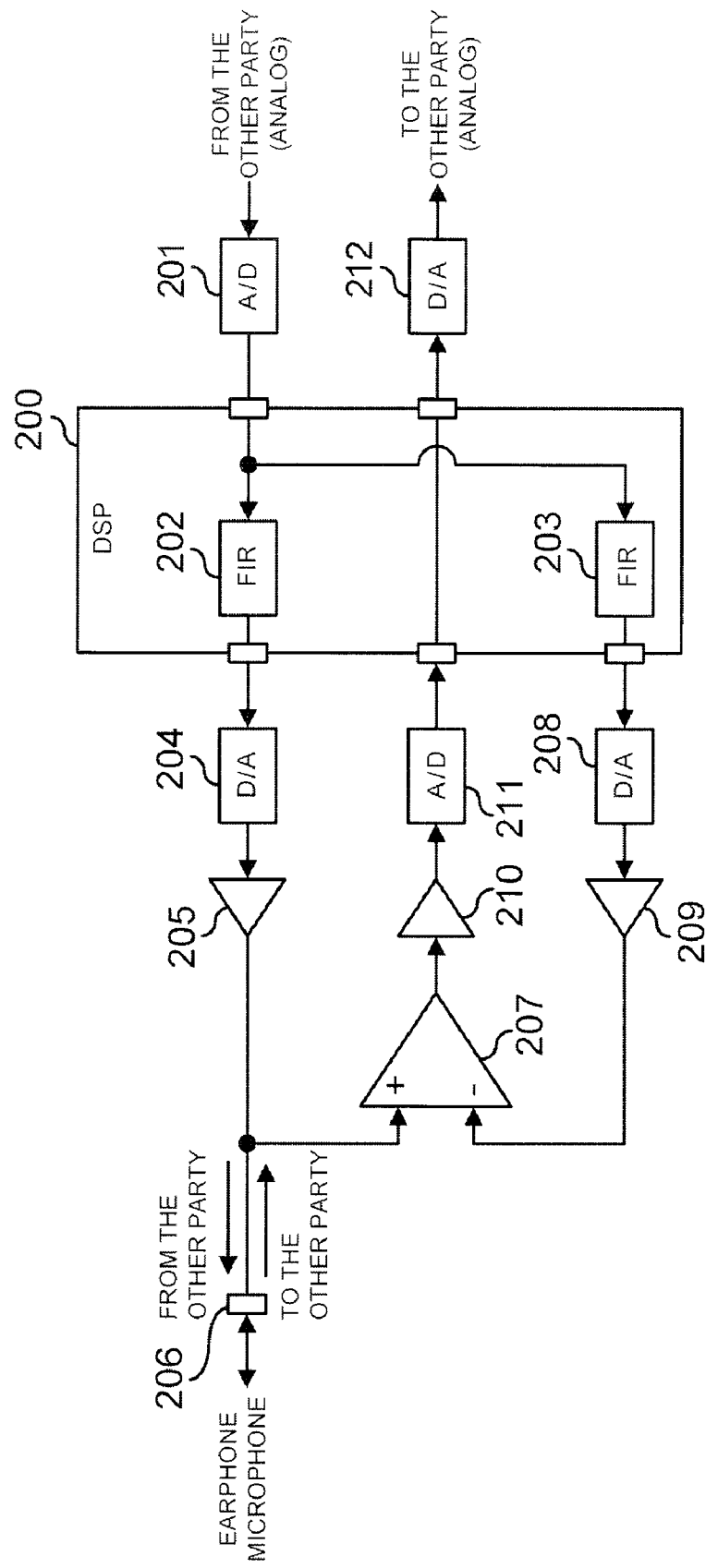
FIG. 15 depicts a typical example of the echo prevention circuit.
Figure 16A:
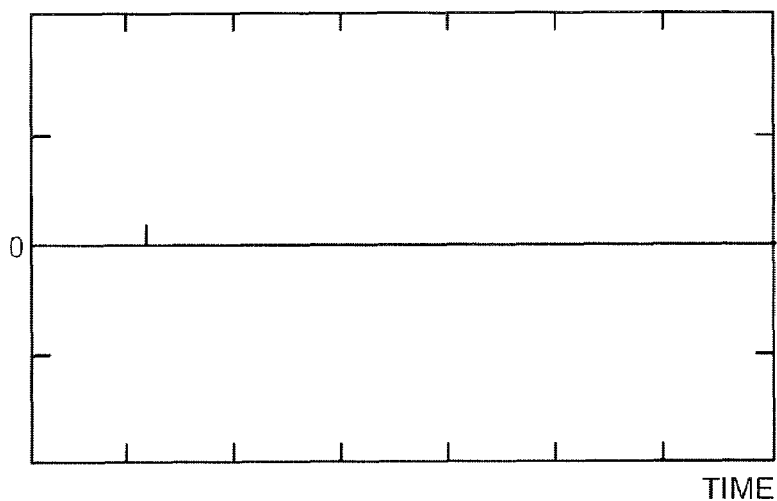
FIG. 16 A-B depicts an example of impulse responses acquired when generating a small impulse.
Figure 16B:
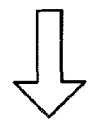
Figure 16B:
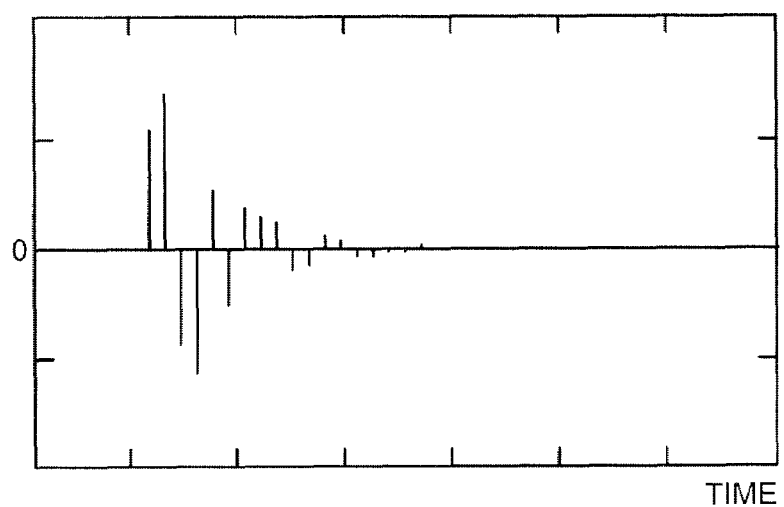
Figure 17A:
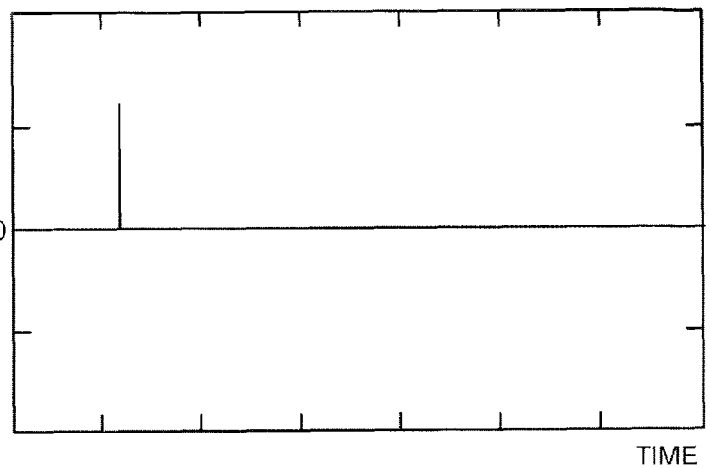
FIG. 17 A-B depicts an example of impulse responses acquired when generating a large impulse.
Figure 17B:
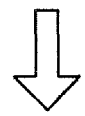
Figure 17B:
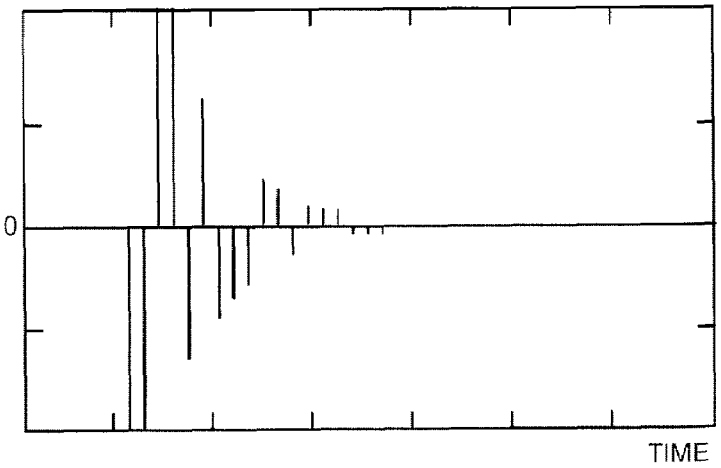

The echo prevention circuit 1 is applicable not only to the mobile phones 110, 115, but also to communication devices where the above echo can be generated. For example, as shown in FIGS. 13 and 14, the echo prevention circuit 1 is applicable to a PC. In the configuration shown in FIG. 13, a device including the echo prevention circuit 1, the CPU 2, and the learning button 4 is connected to a PC 130 through the USB connection, the PC card connection, etc.

In the configuration shown in FIG. 14, only the echo prevention circuit 1 is connected to the PC 130 through the USB connection, the PC card connection, etc. In this configuration, a CPU included in the PC 130 acts as the CPU 2 shown in FIG. 13. The function of the learning button 4 is realized by an input apparatus such as a keyboard and mouse included in the PC 130.

The echo prevention circuit 1 is applicable to various communication devices, such as a transceiver and PDA (Personal Digital Assistants), other than the PC 130.

One embodiment of the present invention has been described. As described above, in the echo prevention circuit 1 of this embodiment, the gain of the amplification circuit configured by the differential amplification circuit 19 and the amplification circuit 17 is set to A (e.g., 20 dB) before acquiring the impulse responses IR1'(Z) and IR2'(Z) and is set to B (e.g., 50 dB) after acquiring the impulse responses IR1'(Z) and IR2'(Z). That is, when acquiring the impulse responses IR1'(Z) and IR2'(Z), the gain is small in the amplification circuit configured by the differential amplification circuit 19 and the amplification circuit 17 and, therefore, highly accurate impulse responses can be acquired by the large impulse having resistance to circuit noises and background noises. Since the filter coefficients of the filters are set with the highly accurate impulse responses, the echo can effectively be cancelled. The gain is increased in the amplification circuit configured by the differential amplification circuit 19 and the amplification circuit 17 after acquiring the impulse responses, the weak audio signal input from the earphone microphone 5 can be amplified to an appropriate level.

By executing the program stored in the memory 41 with the DSP core 40, the controlling unit can be realized to adjust the gain of the amplification circuit configured by the differential amplification circuit 19 and the amplification circuit 17.

The memory 41 may store the information indicating the necessity of the impulse learning (response signal acquisition necessity information), and the control unit realized by the DSP core 40 may determine the necessity of the impulse learning based on the information. When the impulse learning is not needed, the time required for enabling the normal operation can be reduced by performing the impulse learning as needed in this way, instead of performing the impulse learning unconditionally at the time of power-on, etc.

The control unit realized by the DSP core 40 may perform the impulse learning again in response to the pressing down of the learning button 4, etc. By enabling the impulse learning again during the normal operation, the filter coefficients of the filters can be changed such that the echo can be cancelled effectively without rebooting when the earphone microphone 5 is changed or when the user of the earphone microphone 5 is changed.

The above embodiments and application examples are for the purpose of facilitating the understanding of the present invention and do not limit the interpretation of the present invention. The present invention may be changed/altered without departing from the spirit thereof and the present invention includes the equivalents thereof.

Although the filter coefficients of the filters are set, for example, based on the impulse responses acquired by generating the impulse in this embodiment, the signal used for setting the filter coefficients is not limited to the impulse. For example, the filter coefficients of the filters may be set based on the response signal acquired when generating the step signal.

It is claimed:

1. An echo prevention circuit comprising:
    a filter that is inputted with a first digital signal, the filter outputting second and third digital signals;
    a first DA converter that converts the second digital signal into a first analog signal and outputs the first analog signal;
    a second DA converter that converts the third digital signal into a second analog signal and outputs the second analog signal;
    an input/output terminal that outputs the first analog signal or that is inputted with a third analog signal;
    a subtracting circuit that outputs a fourth analog signal acquired by subtracting the second analog signal from a signal generated by combining the first analog signal and the third analog signal;
    an amplification circuit that amplifies the signal output from the subtracting circuit and outputs the amplified signal;
    an AD converter that converts the signal output from the amplification circuit into a digital signal and outputs the digital signal;
    a response signal acquiring unit that inputs a first signal to the first DA converter to acquire a first response signal from the input of the first DA converter to the output of the AD converter, the response signal acquiring unit inputting a second signal to the second DA converter to acquire a second response signal from the input of the second DA converter to the output of the AD converter; and
    a filter coefficient setting unit that sets filter coefficients to the filter based on the first and second response signals such that the fourth analog signal becomes a signal generated by removing or attenuating the first analog signal from the signal generated by combining the first analog signal and the third analog signal,
    the amplification circuit setting a gain to a first gain in response to a first control signal input before acquiring the first and second response signals, the amplification circuit setting the gain to a second gain larger than the first gain in response to a second control signal input after acquiring the first and second response signals.

2. The echo prevention circuit of claim 1, wherein
    the combination of the subtracting circuit and the amplification circuit is a differential amplification circuit that is inputted with the signal generated by combining the first analog signal and the third analog signal, and the second analog signal.

3. The echo prevention circuit of claim 2, further comprising:
    a controlling unit that outputs the first control signal to set the gain of the amplification circuit to the first gain, the controlling unit allowing the response signal acquiring unit to acquire the first and second response signals after the gain of the amplification circuit is set to the first gain, the controlling unit allowing the filter coefficient setting unit to set the filter coefficients of the filter based on the first and second response signals, the controlling unit outputting the second control signal to set the gain of the amplification circuit to the second gain after allowing the response signal acquiring unit to acquire the first and second response signals.

4. The echo prevention circuit of claim 3, further comprising:
    a response signal acquisition necessity information storage unit that stores response signal acquisition necessity information indicating the necessity of the acquisition of the first and second response signals,
    wherein if the response signal acquisition necessity information is information indicating that the first and second response signals are needed to be acquired, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals, and
    wherein if the response signal acquisition necessity information is information indicating that the first and second response signals are not needed to be acquired, the controlling unit allows the filter coefficient setting unit to set a predetermined filter coefficients for the filter and outputs the second control signal to set the gain of the amplification circuit to the second gain.

5. The echo prevention circuit of claim 4, wherein
    in response to a signal indicating the reset of the filter coefficients of the filter, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals.

6. The echo prevention circuit of claim 3, wherein
    in response to a signal indicating the reset of the filter coefficients of the filter, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals.

7. The echo prevention circuit of claim 1, wherein
the subtracting circuit is a differential amplification circuit that is inputted with the signal generated by combining the first analog signal and the third analog signal, and the second analog signal, and wherein
the amplification circuit is a circuit that amplifies the signal output from the differential amplification circuit and outputs the amplified signal.

8. The echo prevention circuit of claim 7, further comprising:
a controlling unit that outputs the first control signal to set the gain of the amplification circuit to the first gain, the controlling unit allowing the response signal acquiring unit to acquire the first and second response signals after the gain of the amplification circuit is set to the first gain, the controlling unit allowing the filter coefficient setting unit to set the filter coefficients of the filter based on the first and second response signals, the controlling unit outputting the second control signal to set the gain of the amplification circuit to the second gain after allowing the response signal acquiring unit to acquire the first and second response signals.

9. The echo prevention circuit of claim 8, further comprising:
a response signal acquisition necessity information storage unit that stores response signal acquisition necessity information indicating the necessity of the acquisition of the first and second response signals,
wherein if the response signal acquisition necessity information is information indicating that the first and second response signals are needed to be acquired, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals, and
wherein if the response signal acquisition necessity information is information indicating that the first and second response signals are not needed to be acquired, the controlling unit allows the filter coefficient setting unit to set a predetermined filter coefficients for the filter and outputs the second control signal to set the gain of the amplification circuit to the second gain.

10. The echo prevention circuit of claim 9, wherein
in response to a signal indicating the reset of the filter coefficients of the filter, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals.

11. The echo prevention circuit of claim 8, wherein
in response to a signal indicating the reset of the filter coefficients of the filter, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals.

12. The echo prevention circuit of claim 1, further comprising:
a controlling unit that outputs the first control signal to set the gain of the amplification circuit to the first gain, the controlling unit allowing the response signal acquiring unit to acquire the first and second response signals after the gain of the amplification circuit is set to the first gain, the controlling unit allowing the filter coefficient setting unit to set the filter coefficients of the filter based on the first and second response signals, the controlling unit outputting the second control signal to set the gain of the amplification circuit to the second gain after allowing the response signal acquiring unit to acquire the first and second response signals.

13. The echo prevention circuit of claim 12, further comprising:
a response signal acquisition necessity information storage unit that stores response signal acquisition necessity information indicating the necessity of the acquisition of the first and second response signals,
wherein if the response signal acquisition necessity information is information indicating that the first and second response signals are needed to be acquired, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals, and
wherein if the response signal acquisition necessity information is information indicating that the first and second response signals are not needed to be acquired, the controlling unit allows the filter coefficient setting unit to set a predetermined filter coefficients for the filter and outputs the second control signal to set the gain of the amplification circuit to the second gain.

14. The echo prevention circuit of claim 13, wherein
in response to a signal indicating the reset of the filter coefficients of the filter, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals.

15. The echo prevention circuit of claim 12, wherein
in response to a signal indicating the reset of the filter coefficients of the filter, the controlling unit outputs the first control signal to set the gain of the amplification circuit to the first gain, allows the response signal acquiring unit to acquire the first and second response signals after the gain of the amplification circuit is set to the first gain, allows the filter coefficient setting unit to set the filter coefficients of the filter based on the first and second response signals, and outputs the second control signal to set the gain of the amplification circuit to the second gain after allowing the response signal acquiring unit to acquire the first and second response signals.

16. A filter coefficient setting method of an echo prevention circuit including:
a filter that is inputted with a first digital signal, the filter outputting second and third digital signals;
a first DA converter that converts the second digital signal into a first analog signal and outputs the first analog signal;
a second DA converter that converts the third digital signal into a second analog signal and outputs the second analog signal;
an input/output terminal that outputs the first analog signal or that is inputted with a third analog signal;
a subtracting circuit that outputs a fourth analog signal acquired by subtracting the second analog signal from a signal generated by combining the first analog signal and the third analog signal;
an amplification circuit that amplifies the signal output from the subtracting circuit and outputs the amplified signal; and
an AD converter that converts the signal output from the amplification circuit into a digital signal and outputs the digital signal, the method comprising the steps of:
setting the gain of the amplification circuit to a first gain in response to a first control signal input;
inputting a first signal to the first DA converter to acquire a first response signal from the input of the first DA converter to the output of the AD converter and inputting a second signal to the second DA converter to acquire a second response signal from the input of the second DA converter to the output of the AD converter;
setting filter coefficients to the filter based on the first and second response signals such that the fourth analog signal becomes a signal generated by removing or attenuating the first analog signal from the signal generated by combining the first analog signal and the third analog signal; and
setting the gain to a second gain larger than the first gain in response to a second control signal input after acquiring the first and second response signals.

17. A recording medium having recorded thereon a program operable to drive a processor of an echo prevention circuit including:
the processor;
a filter that is inputted with a first digital signal, the filter outputting second and third digital signals;
a first DA converter that converts the second digital signal into a first analog signal and outputs the first analog signal;
a second DA converter that converts the third digital signal into a second analog signal and outputs the second analog signal;
an input/output terminal that outputs the first analog signal or that is inputted with a third analog signal;
a subtracting circuit that outputs a fourth analog signal acquired by subtracting the second analog signal from a signal generated by combining the first analog signal and the third analog signal;
an amplification circuit that amplifies the signal output from the subtracting circuit with a first gain or a second gain larger than the first gain and outputs the amplified signal;
an AD converter that converts the signal output from the amplification circuit into a digital signal and outputs the digital signal;
a response signal acquiring unit that inputs a first signal to the first DA converter to acquire a first response signal from the input of the first DA converter to the output of the AD converter, the response signal acquiring unit inputting a second signal to the second DA converter to acquire a second response signal from the input of the second DA converter to the output of the AD converter; and
a filter coefficient setting unit that sets filter coefficients to the filter based on the first and second response signals such that the fourth analog signal becomes a signal generated by removing or attenuating the first analog signal from the signal generated by combining the first analog signal and the third analog signal,
to implement functions of:
outputting to the amplification circuit a first control signal for setting the gain of the amplification circuit to the first gain;
allowing the response signal acquiring unit to acquire the first and second response signals after the gain of the amplification circuit is set to the first gain and allowing the filter coefficient setting unit to set the filter coefficients of the filter based on the first and second response signals; and
outputting to the amplification circuit a second control signal for setting the gain of the amplification circuit to the second gain after acquiring the first and second response signals.

* * * * *